(12) United States Patent
Leitch et al.

(10) Patent No.: US 12,378,853 B2
(45) Date of Patent: Aug. 5, 2025

(54) SAFETY BRAKE FOR ELECTRICAL SUBMERSIBLE PUMPS POWERED BY PERMANENT MAGNET MOTORS

(71) Applicant: Protex ESP, LLC, Houston, TX (US)

(72) Inventors: Andrew Jardine Leitch, Barcelona (ES); Paul Reginald Shotter, Houston, TX (US)

(73) Assignee: Protex ESP, LLC, Houston, TX (US)

( * ) Notice: Subject to any disclaimer, the term of this patent is extended or adjusted under 35 U.S.C. 154(b) by 0 days.

(21) Appl. No.: 18/583,742

(22) Filed: Feb. 21, 2024

(65) Prior Publication Data

US 2024/0352835 A1    Oct. 24, 2024

Related U.S. Application Data

(60) Provisional application No. 63/460,709, filed on Apr. 20, 2023.

(51) Int. Cl.
| | |
|---|---|
| *E21B 43/12* | (2006.01) |
| *F04B 17/03* | (2006.01) |
| *F04B 53/14* | (2006.01) |
| *F04B 53/16* | (2006.01) |
| *F16D 11/14* | (2006.01) |
| *F16D 67/04* | (2006.01) |

(Continued)

(52) U.S. Cl.
CPC ............ *E21B 43/121* (2013.01); *F04B 17/03* (2013.01); *F04B 53/162* (2013.01); *F16D 11/14* (2013.01); *F16D 67/04* (2013.01); *F04B 53/143* (2013.01); *F04B 2205/15* (2013.01); *F16D 2125/06* (2013.01); *F16D 2127/06* (2013.01)

(58) Field of Classification Search
CPC ...... E21B 43/121; E21B 43/128; F04B 17/03; F04B 53/162; F04B 53/143; F04B 2205/15; F04B 47/06; F04B 53/14; F16D 11/14; F16D 67/04; F16D 2125/06; F16D 2127/06; F04D 13/10
See application file for complete search history.

(56) References Cited

U.S. PATENT DOCUMENTS

| | | | | |
|---|---|---|---|---|
| 6,889,765 B1 * | 5/2005 | Traylor | ............... | F04B 43/1136 166/105.5 |
| 7,841,395 B2 * | 11/2010 | Gay | ...................... | E21B 43/128 166/57 |

(Continued)

OTHER PUBLICATIONS

Search Report in counterpart UK Appl. No. GB2405569.1 mailed Sep. 27, 2024, 4-pgs.

*Primary Examiner* — James G Sayre
(74) *Attorney, Agent, or Firm* — Cabello Hall Zinda, PLLC

(57) ABSTRACT

A device disclosed herein is used with an electric submersible pump (ESP) assembly disposed on tubing in a well. A housing of the device connects between tubing and pump. A shaft in the housing can rotate in response to imparted rotation associated with the pump and permanent magnet (PM) motor. A piston in the housing can move longitudinally relative to the shaft in response to a pressure differential across the piston. A clutch on the piston can engage and disengage with a distal end of the shaft in response to the piston's movement of the piston. Additionally or alternatively, a key on the piston can engage and disengage with a pocket on the shaft. The engagement of the clutch and/or key can prevent imparted rotation associated with the pump and the PM motor.

36 Claims, 18 Drawing Sheets

(51) Int. Cl.
*F16D 125/06* (2012.01)
*F16D 127/06* (2012.01)

(56) References Cited

U.S. PATENT DOCUMENTS

| | | | |
|---|---|---|---|
| 7,900,707 B2 | 3/2011 | Shotter et al. | |
| 2006/0266526 A1* | 11/2006 | Ocalan | E21B 43/128 166/370 |
| 2007/0183900 A1* | 8/2007 | Ocalan | E21B 43/128 417/1 |
| 2015/0037171 A1 | 2/2015 | Orrego et al. | |
| 2015/0139822 A1 | 5/2015 | Jankowski et al. | |
| 2017/0306732 A1 | 10/2017 | Beveridge et al. | |
| 2019/0226307 A1* | 7/2019 | Xiao | F04D 13/10 |
| 2020/0399998 A1 | 12/2020 | Laing et al. | |
| 2021/0320578 A1 | 10/2021 | Sheth et al. | |
| 2021/0348488 A1 | 11/2021 | Perisho et al. | |
| 2023/0076519 A1* | 3/2023 | Henderson | E21B 43/128 |
| 2023/0287772 A1* | 9/2023 | Perisho | E21B 23/08 |

* cited by examiner

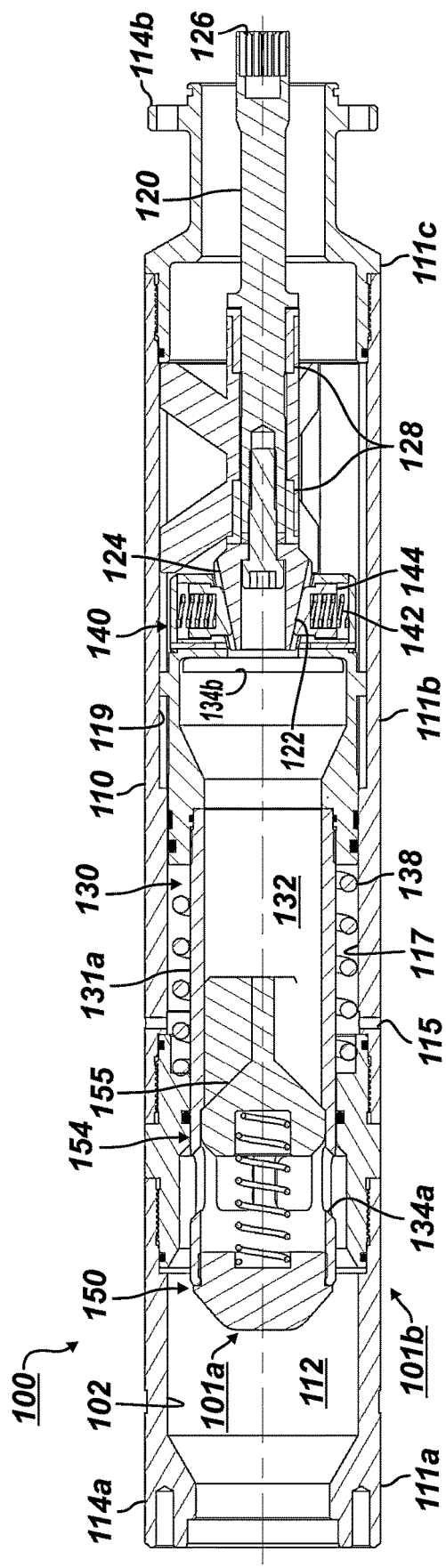
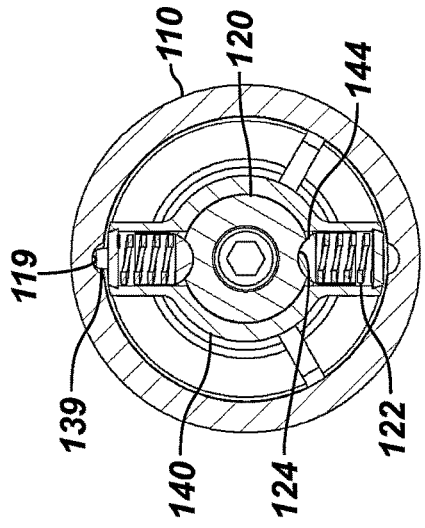
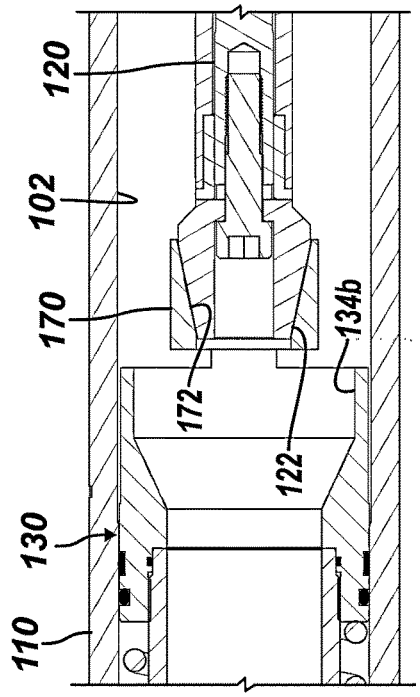
FIG. 5A
FIG. 5B
FIG. 6

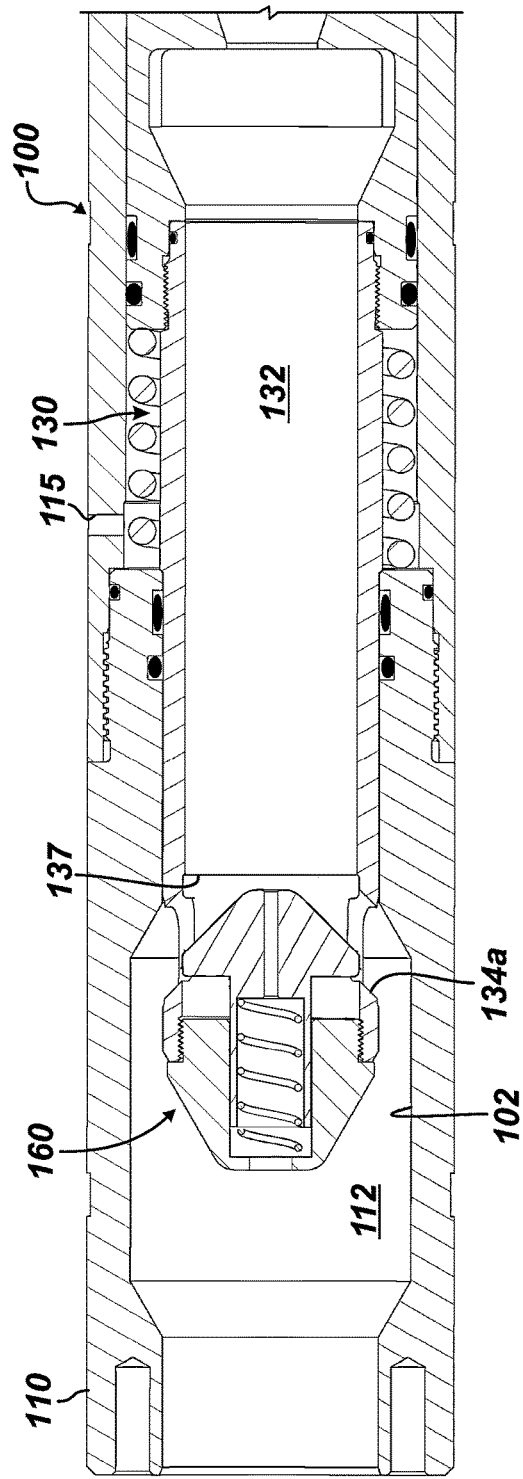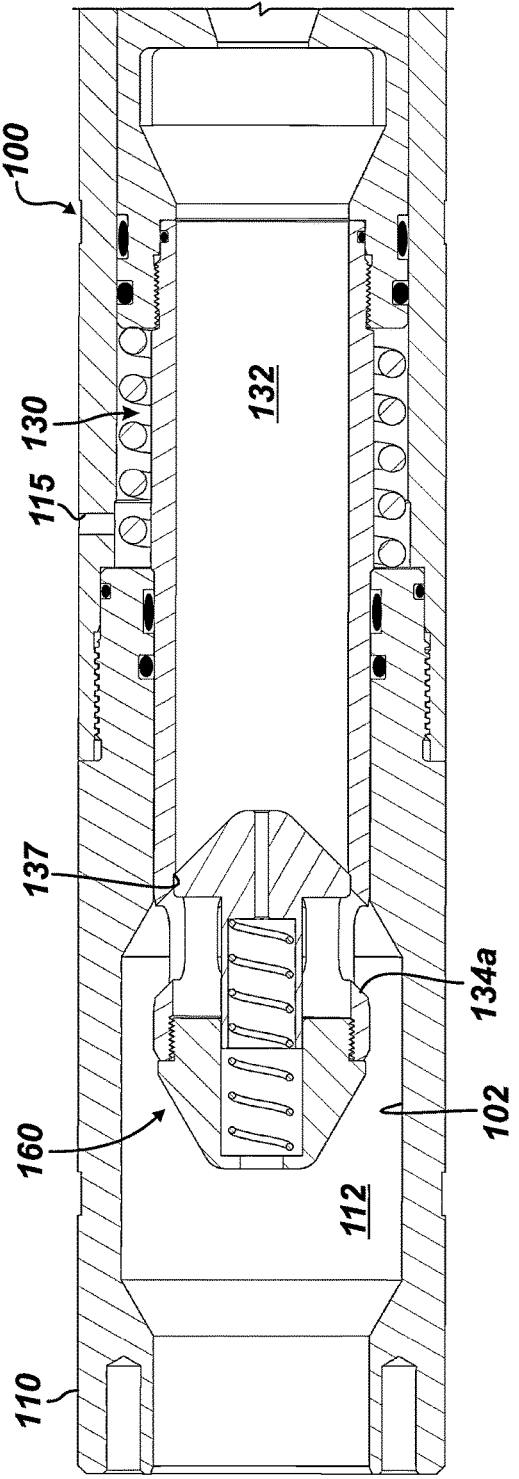

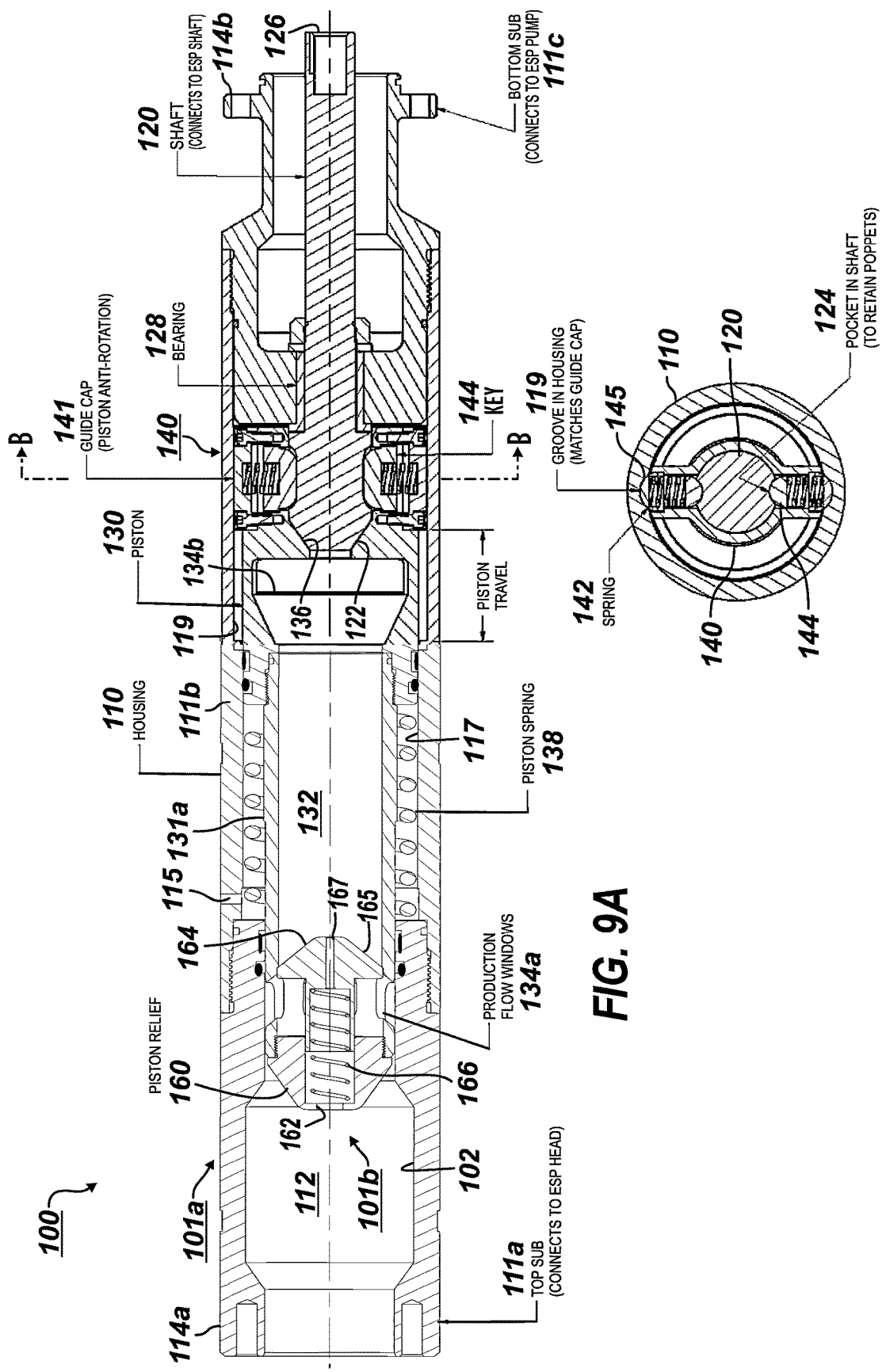

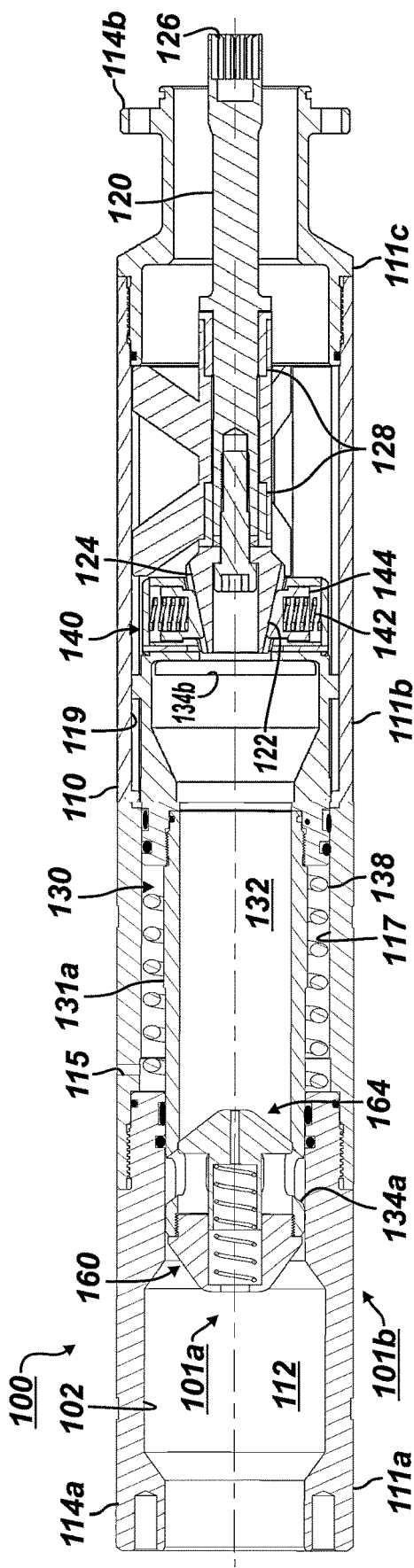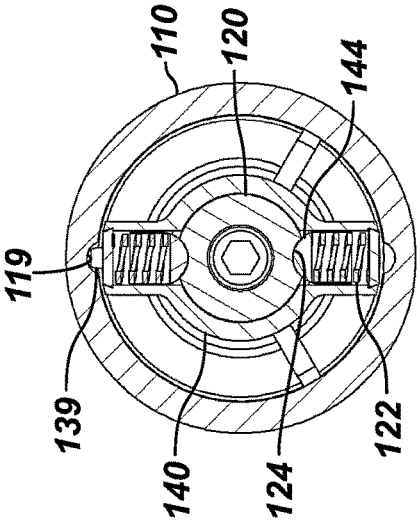
FIG. 10A
FIG. 10B

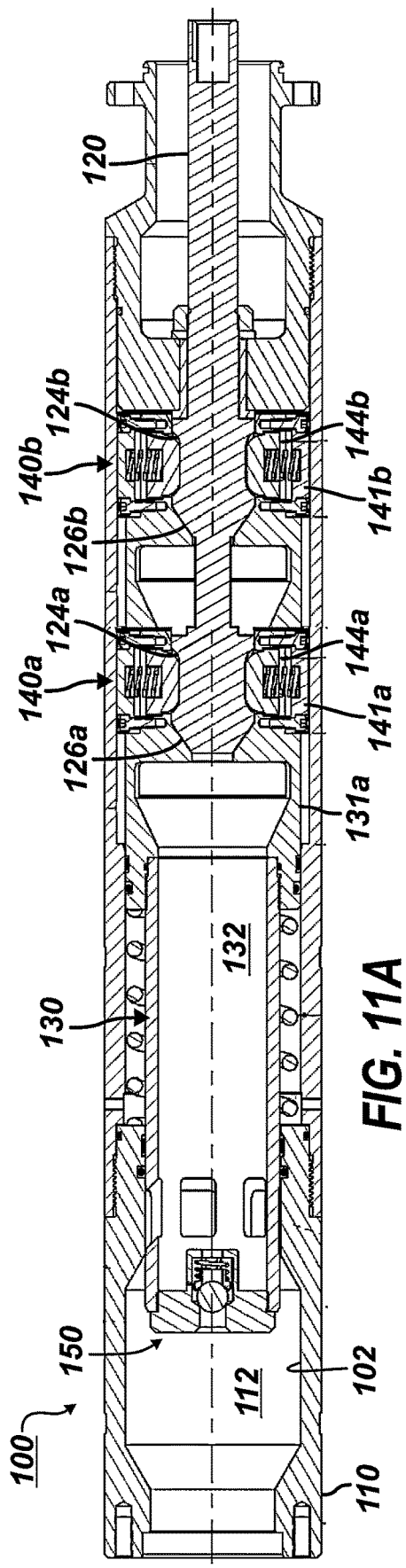
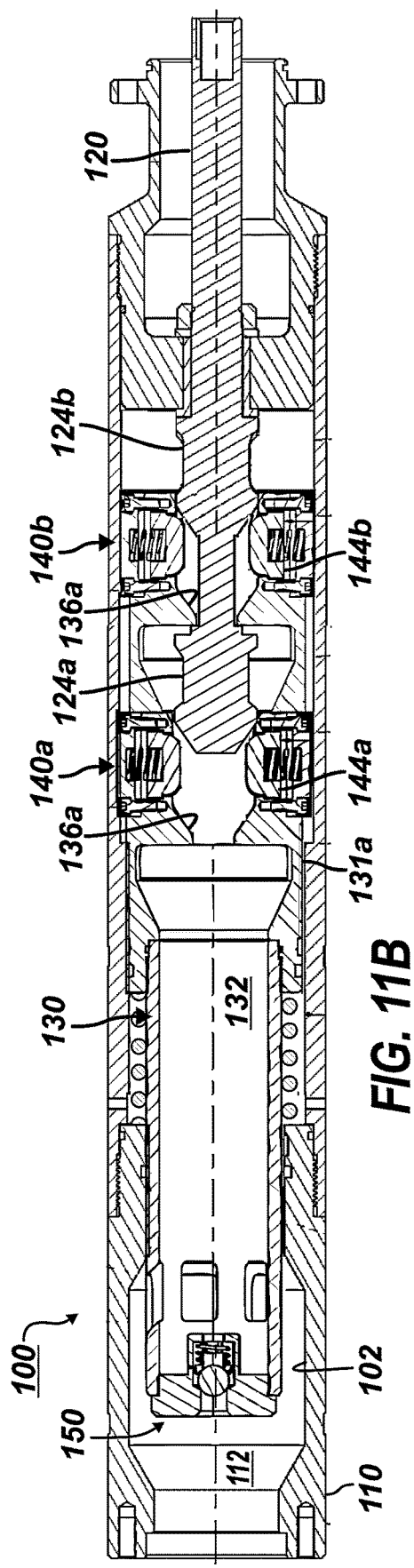
FIG. 11A
FIG. 11B

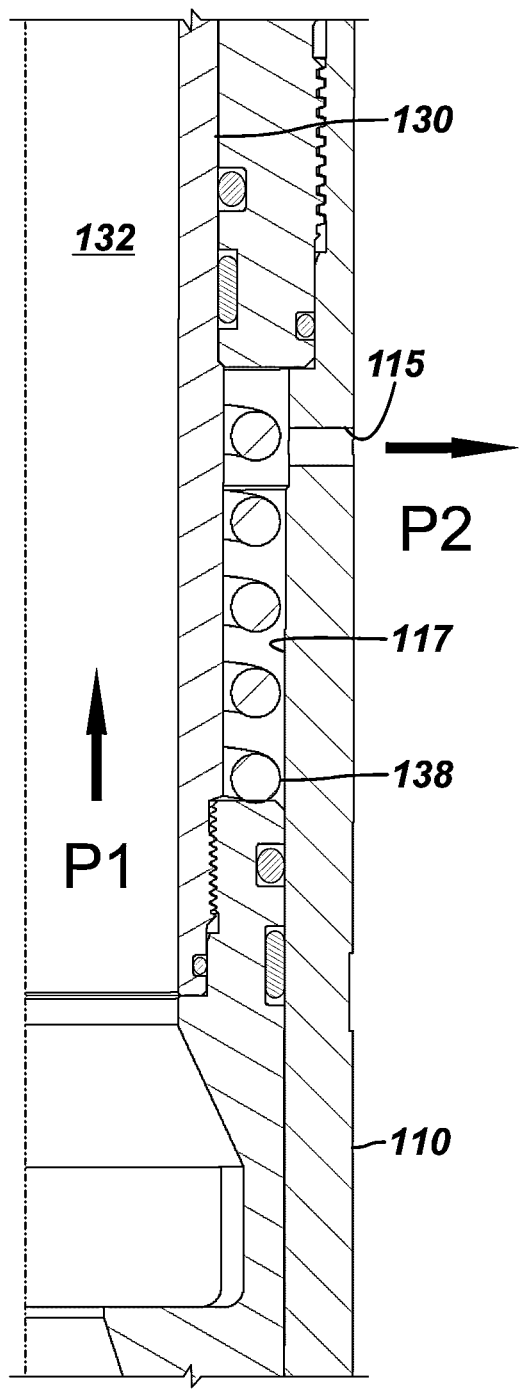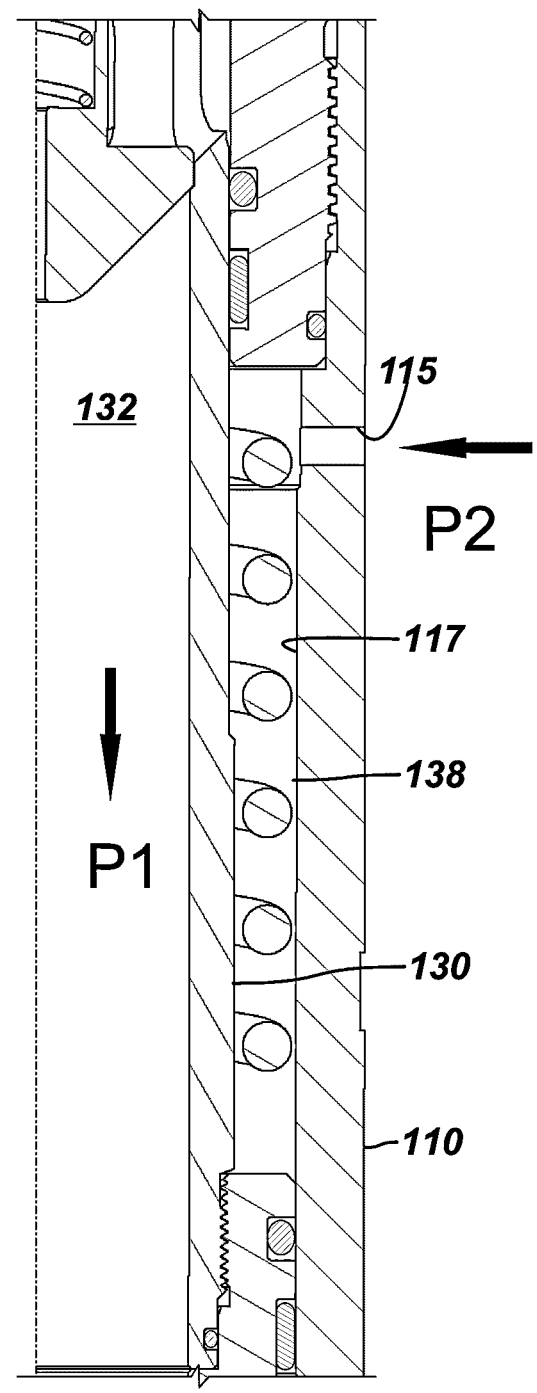
FIG. 16A  FIG. 16B

SAFETY BRAKE FOR ELECTRICAL SUBMERSIBLE PUMPS POWERED BY PERMANENT MAGNET MOTORS

CROSS-REFERENCE TO RELATED APPLICATIONS

This application is with U.S. Provisional Appl. No. 63/460,709 filed Apr. 20, 2023, which is incorporated herein by reference in its entirety.

FIELD OF THE DISCLOSURE

The present disclosure relates to locking a pump shaft and a motor shaft of an Electric Submersible Pump (ESP) system to prevent shaft rotation when the system is not energized by the motor.

BACKGROUND OF THE DISCLOSURE

Remotely operated downhole pumping systems, such as electric submersible pump (ESP) systems, can be used for a variety of applications and can be used in hydrocarbon extraction, such as oil wells and geothermal wells that produce hot water. For example, a subterranean well drilled from the surface into a formation (often several thousand feet deep) is typically lined with a metal casing to prevent the collapse of the wellbore. The ESP system is typically installed at the bottom of production tubing disposed within the wellbore.

The ESP system typically includes an electric motor, a seal section, and a pump. The electric motor is controlled via a power cable from the surface, and the seal section (sometimes referred to as a protector) provides sealing and pressure protection for the motor. Typically, the pump can be a multistage centrifugal pump having multiple impeller stages designed to increase pressure to lift well fluid from the well up the production tubing to surface. The ESP system can be highly efficient and is capable of high production rates and can be particularly well suited for the production of crude oil and hot water (as in geothermal wells).

ESP systems have traditionally been driven by induction type (Squirrel cage) electric motors, usually powered by 50 Hz to 60 Hz AC supply at speeds of 3,000 to 3600 RPM. There is a growing trend to deploy ESP systems with permanent magnet (PM) motors that substitute the traditional induction motor. The PM motor can drive the ESP system at speeds upwards of 8,000 RPM, and the PM motor can also have a smaller diameter compared to an induction motor offering equivalent horsepower. Additionally, the PM motor often runs cooler and is more energy efficient.

Due to the construction and design of an ESP system having either an induction motor or PM motor, shafts of the pump and motor are free to rotate without electric power being supplied. Rotation can occur in the inactive pump when fluid passes through the pump by other hydraulic means. When the fluid is forced though the inactive pump, the force on the impellers creates a rotational force and allows the motor to spin. Unlike an induction motor, spinning of the PM motor can generate high voltage electric current back up the power cable to surface.

This phenomenon can occur in several common situations. During installation of the ESP system—e.g., running in the hole (RIH), fluid can be forced through the pump (from bottom to top—i.e., from downhole end to uphole end) as the tubing string is lowered into the well's static fluid. During pulling out of the hole (POOH), fluid can be forced through the pump (from top to bottom) when the ESP system is pulled up and out of the static fluid in the well. During system shutdown, fluid can be forced through the pump by gravity fallback when the well equalizes, such as after the ESP system has been switched off. Additionally, an unexpected event can occur, and can force fluid through the pump (from bottom to top). For example, a well blow out or a well kick can occur when the well suddenly flows naturally even though the well is expected to be killed. Finally, fluid can be forced through the inactive pump during fluid injection. These and other situations may cause the shaft of the ESP system to rotate and produce electric current.

As fluid passes through the pump, the pump impellers rotate freely and can also quickly accelerate. When an ESP is fitted with a PM motor, dangerous levels of electric current can be generated and sent to the surface. For this reason, personnel are required to perform various operations where live electrical current could exist during installation, retrieval, and shutdown of an ESP system having a PM motor. Even though safety procedures and operating methods may be stringent, there remains a danger of electric shock to personnel when various operations are carried out.

Various techniques exist to address this problem and to mitigate the danger of electric shock during the process of installation and retrieval of an ESP system. In a basic solution, it has become common practice to join all three conductors together at the top end of the power cable at the required time. This practice electrically shorts any power to the surface generated by the PMM by fluid turbine effects and prevents a live to ground differential of power that can cause electric shock to personnel. However, this procedure leaves significant exposure to shock before and after the cable conductors have been connected together. As an example, when the wellhead hanger that suspends the production tubing and the ESP system and the cable, are lifted from the wellhead, the power cable has to be cut by hand before it can be dressed for conductor shorting and loaded onto a cable spool. There may also be no opportunity to short the conductors when an engineer is working on the control panel when the ESP system is expected to be dormant.

In another common solution, an automatic diverter valve or a drain and isolation tool can be installed on the ESP system to plug and drain the fluid in the tubing. Other solutions in the prior art include pump shaft braking techniques that require wireline operation or dropped balls to engage the lock. These can be costly and unreliable techniques.

None of the prior art solutions have so far offered a reliable method to lock and prevent shaft rotation during the common situations when electric current can be produced by the PM motor by fluid passing through the inactive pump.

The subject matter of the present disclosure is directed to overcoming, or at least reducing the effects of, one or more of the problems set forth above.

SUMMARY OF THE DISCLOSURE

A device disclosed herein is used with an electric submersible pump (ESP) system disposed on tubing in a well. The ESP system has a pump and an electric motor. The device comprises a housing, a shaft, a piston, and a clutch. The housing is configured to connect between the tubing and the pump, and the housing has an internal bore configured communicate fluid therethrough. The shaft is disposed in the internal bore and is configured to rotate in response to rotation associated with the ESP system. The piston is disposed in the internal bore of the housing and is movable in a longitudinal movement relative to the shaft in response to a pressure differential across the piston. The clutch is arranged between the piston and the shaft and is configured to engage and disengage between the piston and the shaft in response to the longitudinal movement of the piston. The clutch engaged with the shaft is configured to restrict the rotation of the shaft.

The clutch can be engaged in a first braking function between the piston and the shaft to prevent the rotation of the ESP assembly in response to fluid passing through the ESP system due to the ESP system being moved in the well. The clutch can be further engaged in a second braking function between the piston and the shaft to prevent the rotation of the ESP assembly in response to a fallback of fluid in the tubing passing through the device to the ESP assembly due to a stoppage of the ESP system.

In one arrangement, the clutch comprises at least one surface and at least one key arranged between the piston and the shaft. The at least one key is configured to engage and disengage with the at least one surface in response to the longitudinal movement of the piston. The at least one key engaged with the at least one surface is configured to restrict the rotation of the shaft. The at least one surface and the at least one key can have serrated surfaces configured to engage one another. The at least one surface can be defined on the shaft and can include at least one pocket, while the at least one key can be disposed on the piston. A reverse arrangement can be used for the at least one surface and the at least one key.

In another arrangement, the clutch comprises first and second tapered surfaces. The first tapered surface is disposed on the shaft, and the second tapered surface is disposed on the piston. The second tapered surface is configured to engage and disengage with respect to the first tapered surface of the shaft in response to the longitudinal movement of the piston respectively toward and away from the shaft. The second tapered surface engaged in friction engagement with the first tapered surface is configured to restrict the rotation of the shaft.

In yet another arrangement, the clutch comprises first and second uphole-facing surfaces and first and second downhole-facing surfaces. The first uphole-facing surface and the first downhole-facing surface are disposed on the shaft. The second downhole-facing surface is disposed on the piston and is configured to engage and disengage with respect to the first uphole-facing surface of the shaft in response to the longitudinal movement of the piston respectively toward and away from the shaft. The second uphole-facing surface is disposed on the housing and is configured to engage and disengage with respect to the first downhole facing-surface of the shaft at least in response to the longitudinal movement of the piston toward the shaft.

In another arrangement, the clutch comprises first and second eccentric surfaces and first and second concentric surfaces. The first eccentric surface faces uphole on the shaft, and the first concentric surface faces downhole on the piston. An insert disposed on the piston has the second concentric surface and the second eccentric surface. The second concentric surface faces uphole and is configured to engage and disengage with respect to the first concentric surface of the piston. The second eccentric surface faces downhole and is configured to engage and disengage with respect to the first eccentric surface of the shaft.

A system disclosed herein is used with tubing in a well. The system comprises an electric submersible pump (ESP) assembly and a safety brake device. The ESP assembly is disposed on the tubing and has a pump and an electric motor. The safety brake device is connected between the tubing and the pump. The safety brake device, which has an internal bore configured communicate fluid therethrough, comprises a shaft, a piston, and a clutch. The shaft is disposed in the internal bore and is configured to rotate in response to rotation associated with the ESP assembly. The piston is disposed in the internal bore and is movable in a longitudinal movement relative to the shaft in response to a pressure differential across the piston. The clutch is arranged between the piston and the shaft and is configured to engage and disengage between the piston and the shaft in response to the longitudinal movement of the piston. The clutch engaged with the shaft is configured to restrict the rotation of the shaft.

A method disclosed herein is used with tubing in a well. During a first operation involving an electric submersible pump (ESP) pumping fluid from the well to the tubing, the method comprises: moving a piston in a brake device away from a shaft in the brake device in response to the fluid pumped by the ESP system through the brake device; disengaging, in response to the movement of the piston, a clutch arranged between the piston and the shaft; and allowing the shaft to rotate in the brake device with rotation imparted by the ESP assembly. During a second operation involving the ESP assembly (such as when the ESP system is moved in the well or during a stoppage of the ESP system pumping the fluid), the method comprises: moving the piston in the brake device toward the shaft in the brake device; engaging, in response to the movement of the piston, the clutch arranged between the piston and the shaft; and preventing rotation of the ESP assembly by restricting the rotation of the shaft in the brake device with the engagement of the clutch.

This summary is not intended to summarize each potential embodiment or every aspect of the present disclosure.

BRIEF DESCRIPTION OF THE DRAWINGS

FIGS. 5A-5B illustrate cross-sectional and end-sectional views of another safety brake device of the present disclosure.

FIG. 6 illustrates a cross-sectional view of a portion of yet another safety brake device of the present disclosure.

FIGS. 8A-8C illustrate portions of a safety brake device having an alternative piston arrangement according to the present disclosure.

FIGS. 9A-9B illustrate cross-sectional and end-sectional views of a safety brake device having the alternative piston arrangement of FIGS. 8A-8C.

FIGS. 10A-10B illustrate cross-sectional and end-sectional views of another safety brake device having the alternative piston arrangement of FIGS. 8A-8C.

FIGS. 11A-11B illustrate cross-sectional views of another safety brake device having a multiple clutch arrangement.

FIGS. 16A-16B schematically illustrate operation of the disclosed safety brake device during a well kick event.

DETAILED DESCRIPTION OF THE DISCLOSURE

The present disclosure relates to a system and method of independently and automatically locking a shaft of an electric submersible pump powered by a permanent magnet motor, thereby preventing rotation when the electric submersible pump is not operational.

In general, the system and method disclosed herein operates to stop the rotation of a shaft (or at least slow the shaft rotation) for an electric submersible pump system. To do this, a pressure device supplies force on the shaft. For example, a set of keys, dogs, poppets, or ratchets can engage and interlock on the shaft, and a piston can act on a clutch-brake on the shaft. A set of springs can force the keys adjacent to the shaft so the keys can engage pockets within the shaft. A valve can control the passage of fallback fluid during different circumstances. The system and method disclosed herein can create a hydraulic brake (or dashpot) within the piston, and the system and method disclosed herein can operate automatically to lock a shaft that requires no intervention or added operations.

A. Electric Submersible Pump (ESP) System

Figure 1:
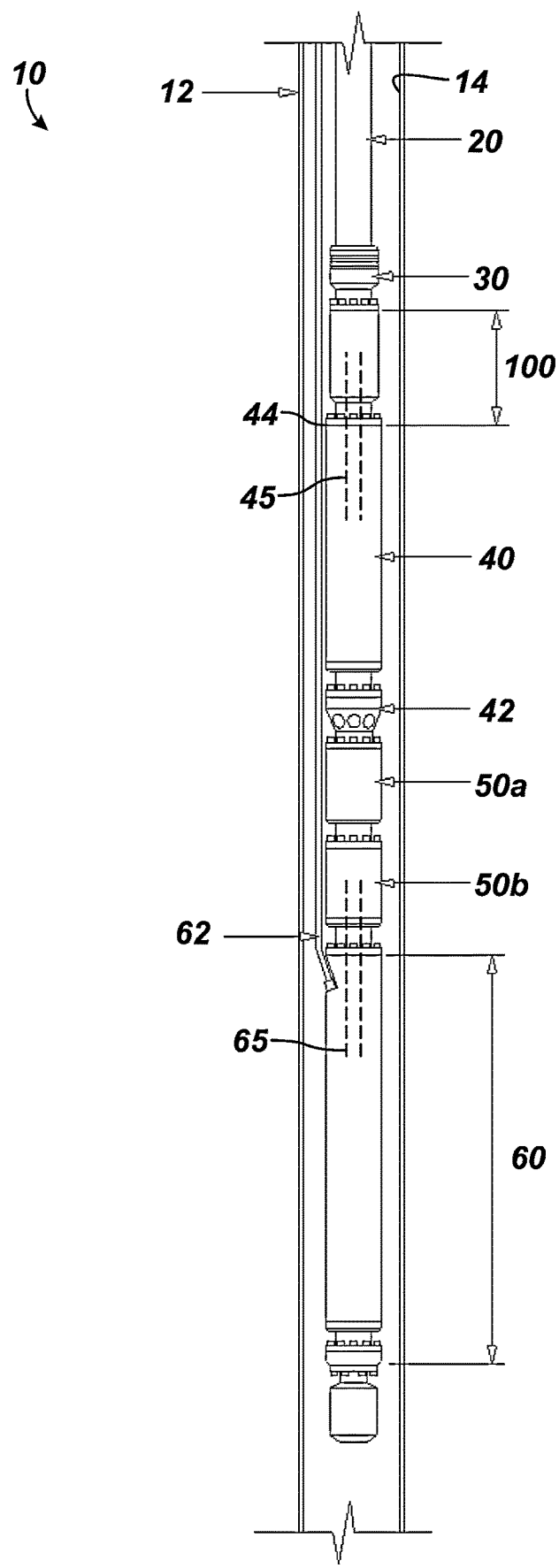
FIG. 1 illustrates an electric submersible pump system according to the present disclosure disposed in a cased wellbore.

FIG. 1 illustrate an electric submersible pump (ESP) system 10 according to the present disclosure disposed in a cased wellbore having casing 12. The ESP system 10 is connected to tubing 20 disposed in the casing 12. The ESP system 10 includes a permanent magnet (PM) motor 60, one or more seals 50a-b, a pump 40, and a safety brake device 100 of the present disclosure.

Advantageously, the disclosed safety brake device 100 can be used with any ESP system 10. For example, the device 100 can be retrofitted to an existing ESP system 10. The safety brake device 100 is automatic in its operation so the device 100 provides automatic braking to the PM motor 60 during risk situations without the need for separate intervention or pre-planning. As shown in the present example, the safety brake device 100 is connected to the bolt-on head 30 on the end of the tubing 20, and the pump 40 connects with a flanged connection below the safety brake device 100. In this configuration, the safety brake device 100 can be installed as an additional element to existing components of an ESP system 10. In other configurations, the safety brake device 100 can incorporate the features of a bolt-on head and can have a flanged connection to the pump 40. In still other configurations, the safety brake device 100 can be incorporated into the pump 40. These and other variations are possible.

The one or more seals 50a-b connect below the pump 40 and seal the pump 40 from the PM motor 60 connected below the seals 50a-b. A power cable 62 runs along the annulus 14 from surface and supplies power and control to the PM motor 60. The pump 40 can be a multistage centrifugal pump having multiple impeller stages designed to increase pressure to lift well fluid from the well up the production tubing 20 to surface. Other types of pumps can be used, such as a progressive cavity pump (PCP).

The safety brake device 100 is provided to match the specifications of the ESP pump 40. The device 100 attaches to the top (uphole end) of the pump 40, interfacing with and bolting up to the flange pattern on the uphole end of the pump 40. The pump shaft 45 and the motor shaft 65 are mechanically connected—e.g., by splined couplings, and the device 100 engages the shaft 45 on the pump 40. The device 100 can also be mechanically connected to the pump shaft 45 by splined couplings. In that sense, the safety brake device 100 provides an extension to the pump shaft 45. The device 100 allows the pump 40 to function during normal operation and provides braking power during shut down and the like, as discussed below.

When operated, the PM motor 60 rotates the motor shaft 65 that passes through the seals 50a-b to the pump 40. Rotation of the motor shaft 65 operates the pump 40, which draws in wellbore fluid into the pump's intake 42, and the pump 40 then lifts the wellbore fluid to surface in the tubing 20. The safety brake device 100 allows the ESP system 10 to operate under normal operating conditions, but the device 100 can prevent or reduce induced rotation in the ESP system 10, and specifically in the PM motor 60, which can produce electric current under the circumstances noted previously in the Background of the present disclosure.

The safety brake device 100 installed on the top of the pump's head 44 is configured to not interfere with the normal operation of the ESP system 10. The function of the safety brake device 100 is to prevent any imparted rotation of the pump's shaft 45 and connected motor shaft 65 caused by the passage of fluid through the pump 40 when the PM motor 60 is deactivated, such as during RIH, fallback, etc. When the PM motor 60 is energized by a normal start up, for example, the safety brake device 100 automatically releases and allows the pump shaft 45 and connected motor shaft 65 to turn freely without interference. Immediately upon deactivation of the PM motor 60, however, the safety brake device 100 engages the shaft 45 and prevents imparted rotation (e.g., back spin of the pump shaft 45 and connected motor shaft 65) due to any fallback fluids or unintended well action. When the motor shaft 65 cannot rotate, the PM motor 60 can be prevented from producing unwanted electric current.

B. Safety Brake Device

Figure 2:
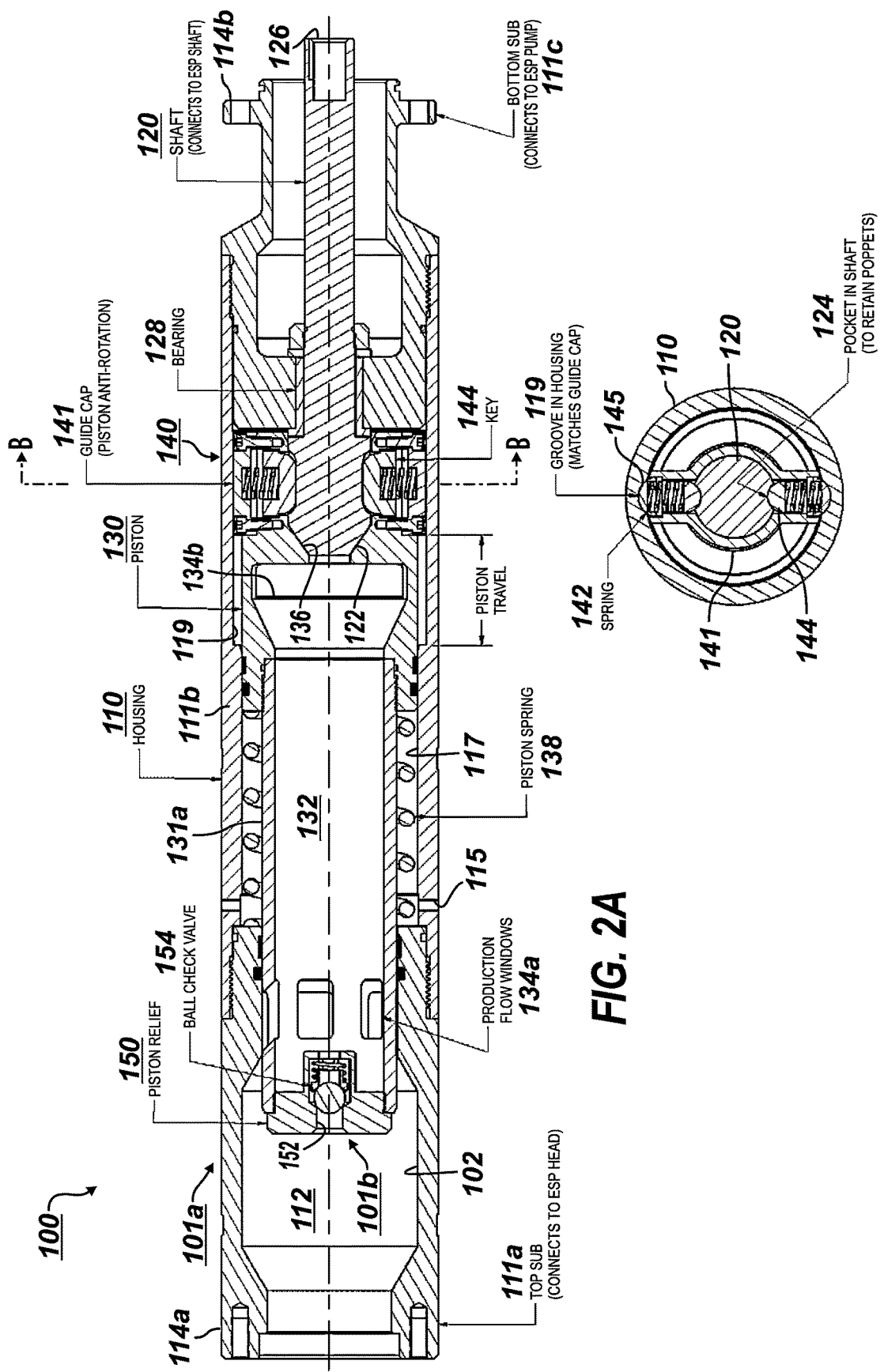
FIGS. 2A-2B illustrate cross-sectional and end-sectional views of a safety brake device of the present disclosure.
Figure 3:
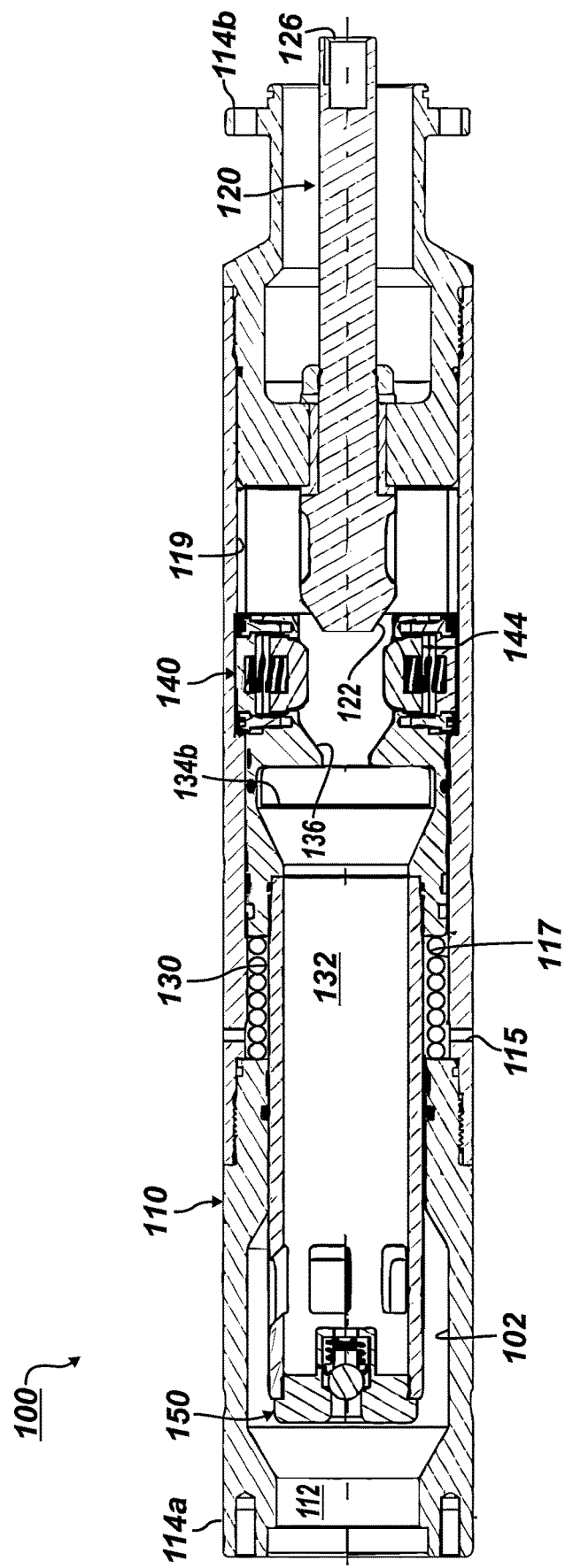
FIG. 3 illustrates a cross-sectional view of the safety brake device in FIGS. 2A-2B in an unlocked condition.
Figure 4A:
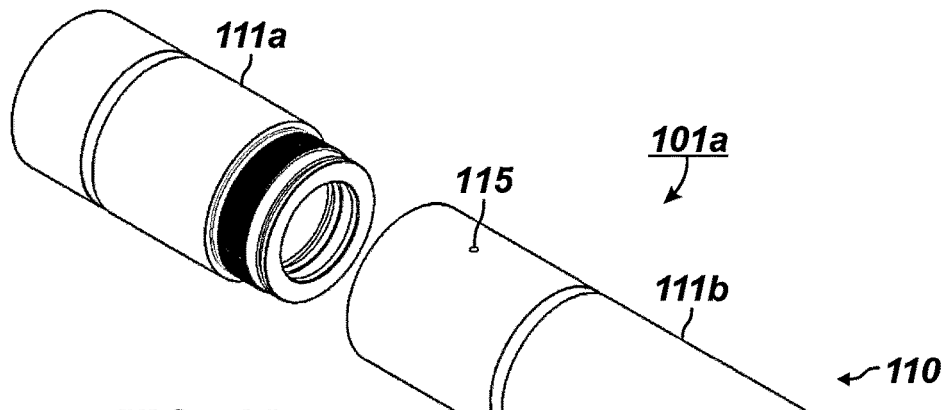
FIG. 4A illustrates an exploded view of an outer assembly of the safety brake device of FIGS. 2A-2B.
Figure 4B:
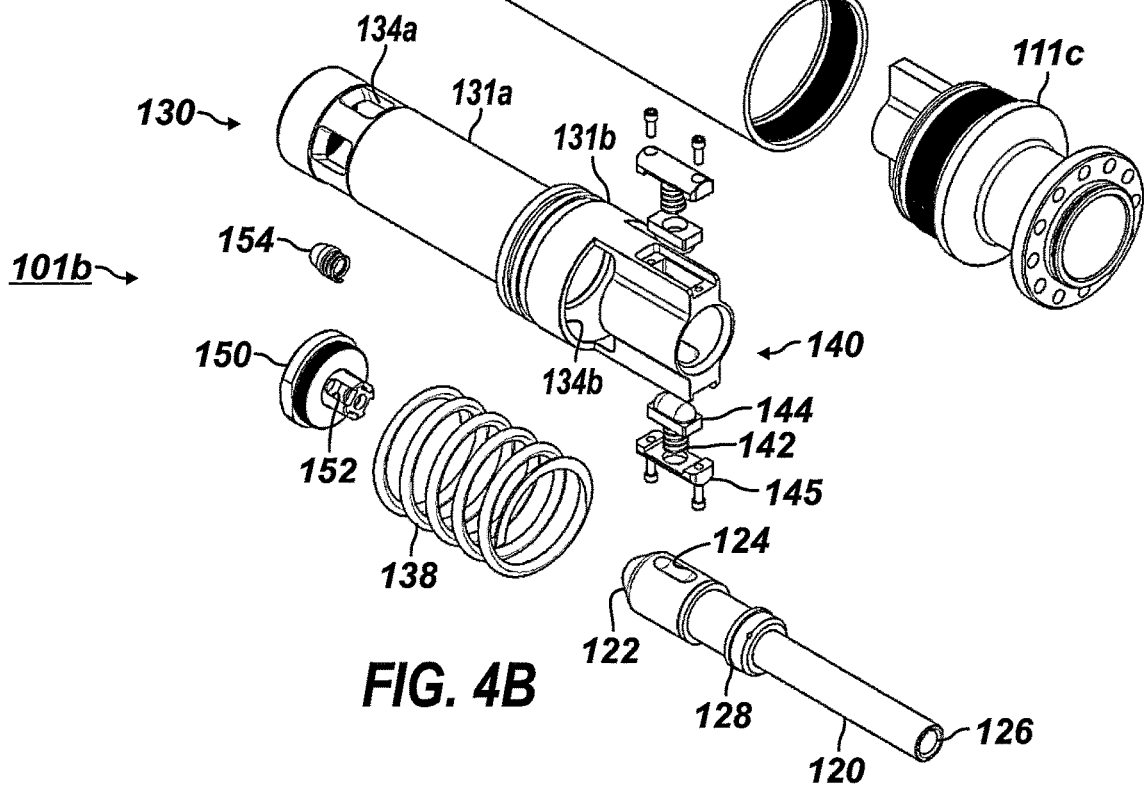
FIG. 4B illustrates an exploded view of an inner assembly of the safety brake device of FIGS. 2A-2B.

Turning to further details of the safety brake device 100, FIG. 2A illustrates a cross-sectional view of a safety brake device 100 of the present disclosure, and FIG. 2B illustrates an end section of the safety brake device 100 of FIG. 2A. FIG. 3 illustrates a cross-sectional view of the safety brake device 100 of FIGS. 2A-2B in an unlocked condition, and FIGS. 4A-4B illustrate exploded views of components of the safety brake device 100.

In general, the safety brake device 100 includes an outer housing assembly 101a and includes an inner assembly 101b that fits inside an inner bore 102 of the housing assembly 101a. As best shown in FIG. 4A, the housing assembly 101a can include several interconnecting housing components for assembly purposes. As shown here, the housing assembly 101a includes a top or uphole subcomponent 111a, a housing 111b, and a bottom or downhole subcomponent 111c.

The uphole subcomponent 111a connects to the head of the ESP system (10), such as a bolt-on head (30) or a discharge head. The uphole subcomponent 111a can be configured to include a pump head geometry and can terminate with a threaded end 114a to connect directly to the production tubing (20).

The housing 111b connects to the uphole and downhole subcomponents 111a, 111c, and the housing 111b houses the main components of the internal assembly 101b. Internally, the housing 111b includes two equally spaced grooves or slots 119 (best shown in FIGS. 2A-2B) that engage the inner assembly 101b to prevent rotation of the piston 130. Seal surfaces provide the sealing with the mating internal assembly 101b to provide a dynamic pressure vessel. Finally, the bottom subcomponent 111c has a flanged end 114b that connects directly to a flanged profile of the ESP pump (40). Alternatively, the device 100 can be directly incorporated into the pump (40).

As best shown in FIG. 4B, the inner assembly 101b includes an extension shaft 120, a piston 130, a clutch 140, and a piston relief 150. The piston 130 can be constructed of two or more components for assembly purposes. As shown here, the piston 130 includes a sleeve 131a connected to a piston head 131b. As discussed below, a differential force on the piston 130 due to pump or head pressure can move the piston 130 longitudinally in the housing bore 102.

As best shown in FIG. 2A, the sleeve 131a includes an internal bore 132 and defines flow openings or windows 134a toward the uphole end. A seal inside the housing assembly 101a, such as on the uphole subcomponent 111a, seals with the sleeve 131a, which is allowed to move longitudinally inside the housing 110. The piston head 131b of the piston 130 is connected to the downhole end of the sleeve 131a and seals inside the housing assembly 101a. The piston head 131b has flow openings 134b that allow for communication with the piston's bore 132. A compression spring 138 or other biasing element disposed in a spring chamber 117 between the piston 130 and housing 110 engages the housing assembly 101a and the piston head 131b and tends to urge the piston head 131b toward the extension shaft 120.

The piston relief 150 is installed on the uphole end of the sleeve 131a. The piston relief 150 includes a central passage 152, which holds a flow valve 154. During use, the flow valve 154 permits pressure from uphole fluid to pass through the passage 152 and into the piston's bore 132. For example, the flow valve 154 can typically open during flow-back of fluid when the piston 130 as shown in FIG. 2A is forced to its downhole position and flow through the piston's flow openings 134 is restricted. The flow valve 154 attached to the uphole end of the piston 130 can choke the head of fluid above the safety brake device 100, thereby reducing the back flow when the ESP system (10) is shut down.

As shown here, the flow valve 154 can be a check valve constructed with a ball, a spring, and a seat and can be engineered to a particular flow rate and pressure. Other types of valves can be used. For example, the flow valve 154 can use a poppet valve, a flapper valve, a throttle valve, and the like.

The guide cap 141 is installed on the downhole end of the piston 130 of the piston head 131b. The guide cap 141 holds the keys 144 and springs 142 on the piston 130. The guide cap 141 engages guide slots 119 in the housing 110 to prevent any rotation of the piston 130 and to allow longitudinal travel. Each of the keys 144 is biased by a spring 142 to extend inward from a retracted condition to an extended condition relative to shaft 120.

The extension shaft 120 has a downhole end 126 that connects to the pump shaft (45) so that the extension shaft 120 is an extension of the pump shaft (45). At the downhole end 126, for example, the shaft 120 is typically splined to match the shaft (45) of the ESP pump (40). The extension shaft 120 is constrained to the downhole subcomponent with rotational bearings 128.

The distal end 122 of the shaft 120 is directed toward the piston 130, which can move relative thereto. In particular, the piston head 131b defines a clutch surface 136, and the shaft's distal end 122 is a head. The clutch surface 136 can be tapered and can be complimentary to the tapered head 122. As the piston 130 is moved in the housing assembly 101a due to the pressure differential and other biasing on the piston 130, the clutch surface 136 can be moved against the shaft's head 122. Frictional engagement between the clutch surface 136 and head 122 can provide one method of preventing rotation of the shaft 120, and by extension, can prevent imparted rotation of the pump and motor shafts. (FIG. 2A shows the piston 130 moved to a shut-down condition having the clutch surface 136 engaged with the head 122.)

As shown here, the clutch surface 136 and head 122 have tapered surfaces. Thus, the tapered clutch surface 136 defines a conical pocket, and the tapered head 122 defines a conical tip. The tapered surfaces of the clutch surface 136 and head 122 provide additional surface area for the friction engagement and can help center the engagement between the clutch surface 136 and head 122. In any event, other arrangements can be used for the surface engagement between the clutch surface 136 and head 122.

The shaft 120 also has pockets or slots 124 (i.e., pocket portion) defined in the sides of the shaft 120 into which the keys 144 of the guide cap 141 can lock during ESP shut-down. Engagement between the keys 144 with the pockets 124 provides another method of preventing shaft rotation. In particular, the keys 144 are forced adjacent to the shaft 120 by springs 142 so the keys 144 engages the pockets 124 on the shaft 120. The keys 144 and pockets 124 are designed so that they engage when fully aligned, thus preventing partial engagement during travel of the piston 130 and guide cap 141 relative to the head 122 of the extension shaft 120.

Although not shown, a reverse arrangement can be used between the piston 130 and the shaft 120. The piston 130 can define at least one pocket, and the shaft 120 can have at least one key disposed on the shaft 120 and configured to engage and disengage with the at least one pocket of the piston 130 in response to the longitudinal movement of the piston 130.

FIG. 2A shows the piston 130 moved to a shut-down condition having the keys 144 engaged in the pockets 124. The end section in FIG. 2B shows how the keys 144 engage in the pockets 124. In general, one or more keys 144 and pockets 124 can be used. As shown here, dual locking by two keys 144 and pockets 124 on opposing sides of the arrangement can be used. More or fewer keys 144 and pockets 124 can be used depending on the implementation and the required torque resistance. In some implementations, the required torque resistance can be about 50 to 100 ft-lbs. but not limited to these figures.

FIG. 2B also shows the engagement of the guide cap 141 in the longitudinal slots 119 of the housing 110. Retainers 145 on the guide cap 141 used to retain the springs 142 can ride in the longitudinal slots 119 of the housing 110 to prevent rotation of the piston 130. Other features can be used.

On normal startup of the ESP system (10), the extension shaft 120 rotates, building very rapidly to full speed (e.g., 3,000 RPM) in less than a second or two. The power and the torque of the motor (60) acting upon the device 100 is sufficient to overcome the restriction provided by the keys 144 by forcing them out of the corresponding pockets 124 in the extension shaft 120 and allowing the keys 144 to momentarily ride on the outside of the shaft 120. Fluid pressure created by the rotation of the pump stages in the pump (40) immediately acts upon the differential piston 130 within the device 100. As the piston 130 is moved by the differential pressure from the flow of fluid lifted uphole, the piston 130 carries the clutch surface 136 and keys 144 into a disengaged position from the extension shaft 120. Again, FIG. 3 shows the device 100 with the piston 130 in a disengaged condition.

The piston 130 moves by the internal/external pressure differential created by the pump (40). As the piston 130 moves, the piston 130 separates from the shaft 120 to a disengaged position, ensuring the keys 144 are free and cannot engage the shaft 120 as the ESP system (10) continues to operate. During ESP operation, the pressure differential acting on the piston 130 ensures the piston 130 is fully disengaged and docked in that position, which ensures that the keys 144 of the clutch 140 do no contact the shaft 120. All the while, fluid can flow uphole through the safety brake device 100 by passing into the openings 134b on the piston head 131b, through the piston bore 132, and out the windows 134a in the piston's sleeve 131a, which are disposed in the expanded section of the housing assembly 101a.

When the ESP system is shutdown (i.e., power to the ESP motor (60) from surface ceases), the column of fluid in the production tubing (20) above the system (10) will start to drain back downhole by gravity, through the pump (40), out the intake (42), and up the annulus 14 until the well equalizes. When this occurs, the falling back fluid is immediately restricted in the device 100 by the return of the piston 130 to the engaged position. In the engaged position as best shown in FIG. 2A, the piston 130 restricts the flow area back through the device 100 to the pump (40), as the flow windows 134a are moved out of the expanded section of the housing assembly 101a. The flow valve 154 within the piston relief 150 ensures a controlled back flow to allow the well to equalize. At the same time, the flow valve 154 reduces the back-flow rate to ensure the fluid movement is insufficient to drive the pump (40) and thus prevents dangerous voltage being generated by the PM motor (60).

During fall-back of fluid at shutdown, the pressure created by the head of fluid above the device 100 acts on the complete surface area of the piston 130 to produce a force that engages the clutch engagement (tapered clutch portions or surfaces 136, 122) between the piston 130 and the shaft 120, which provides an instant brake action on the shaft 120. Consequently, the keys 144 then engage the pockets 124 on the shaft 120 to positively lock the shaft 120 and prevent further rotation. Simultaneously, the full head of fluid falling back onto the piston's flow valve 154 will create pressure on the piston 130. Fluid then gradually equalises through the flow valve 154, thus ensuring the clutch engagement does not slam.

The hydraulic braking provided with the disclosed device 100 with a bottom-out feature incorporated within the piston 130 ensures the piston 130 does not create an impact on the ESP shaft(s). With the keys 144 engaged to the shaft 120, a pre-defined load exerted by the springs 142 determines a torque resistance sufficient to prevent rotation by movement of fluid in the pump 40. However, the torque resistance provided by the keys 144 is overcome by the torque from the PM motor (60) when actively operated.

The above operation can be performed during the common situations in which forced fluid on the inactive pump (40) can cause rotation that generates electric current.

During running-in-hole (system installation) as the ESP system 10 is lowered downhole into the static fluid, for example, the pump (40) will pass through the static well fluid and will create a minor upward force on the piston 130. However, the force on the piston 130 is insufficient to disengage the piston 130. The force is countered by the predetermined strength of the spring 138 holding the piston 130 engaged with the shaft 120 and is countered by the predetermined strength of the springs 142 locking the keys 144 against the shaft 120. The speed at which an ESP system (10) can be lowered into the well may be limited (e.g., around 5 ft per second). Typically, though, lowering of the ESP system (10) is stopped every joint or two of tubing (30 ft to 60 ft) to make up the pipe connections and to install the protection for the cable (62).

During shutdown of the ESP system 10 (planned or unplanned), the column of fluid above the safety brake device 100 and the ESP system (10) will drain back through the ESP system (10) and equalize in the annulus (14). The rate of drain is controlled by the check valve 154 within the piston 130 to reduce the velocity of fluid reaching the pump (40) and reducing the fluid power from creating rotation of the pump's impellers. The head of fluid therefore equalizes slowly. The greater the fluid level above the device 100, the greater the pressure acts on the piston 130 to increase it braking power, thus maintaining braking power equal to the power being generated by the fall-back fluid.

During retrieval (pull out of hole) as the ESP system (10) moves upwards through the static fluid in the well, the column of fluid in the production tubing (20) above the device 100 again acts to produce a downward force. As before, the fluid movement is restricted by the flow valve 154. As with installation, the ESP system (10) can only travel around 30 ft to 60 ft at a time and is halted periodically, thus preventing build-up of forces. The braking power of the clutch and key engagement reduces the chances for shaft rotation during this retrieval stage.

As noted previously, an unexpected event (blow out or well kick event) can occur. When working on an installation of downhole well equipment, pressure control surface equipment may be removed. The well may suddenly overcome the kill fluid and blow well fluids up the well. Despite careful use of technology to kill the well during workovers, this risk remains and must be mitigated. When using the ESP system (10) having the PM motor (60), the risk is increased unacceptably because a suddenly blow out will spin the PM motor (60) as fluid is driven up through the system's pump (40). Consequently, the PM motor (60) can suddenly generate large voltages that are communicated to the surface.

When the device 100 is installed on the pump head, the piston 130 within the device 100 is activated on ESP system's startup, which creates a positive pressure differential between the interior and exterior of the device 100. As best shown in FIGS. 2A and 4A, the housing assembly 101a of the device 100 includes equalizing ports 115 that communicate the sealed spring chamber 117 between the piston sleeve 131a and the housing assembly 101a where the compression spring 138 is housed.

In an unexpected blow-out situation, the increase in well pressure is delivered up the well through the pump (40) and is also delivered up the annulus (14) simultaneously. This means the pressure differential between the interior and exterior of the device 100 is at least zero. In other words, pressure acting on the opposing areas of the piston 130 combined with the force of the spring 138 can keep the piston 130 in its engaged position so that locking of the shaft 120 will not disengage. Because the locking will not disengage, there will be a pressure drop within the ESP system (10) as the fluid drops pressure over every stationary impeller in the pump (40), which creates a negative pressure differential across the device 100 that in effect adds further braking power to the clutch and key engagement. This safety phenomenon helps to mitigate the greatest risk of electric shock.

C. Alternative Safety Brake Device

In the previous arrangement, the disclosed safety brake device 100 uses both friction and key engagement to prevent shaft rotation. In other arrangements, a safety brake device 100 disclosed herein can use one or other form of engagement. For example, FIGS. 5A-5B illustrate cross-sectional and end-sectional views of a safety brake device 100 using key or ratchet engagement between ratchets or keys 144 with pockets 124 on the head of the extension shaft 120. Operation of this device 100 can be similar to that discussed above so that the details are incorporated herein and are not repeated.

In this example of FIGS. 5A-5B, the extension shaft 120 is supported by a centralizing assembly, and the head 122 having the pockets 124 can be tapered. The keys 144 can be biased by springs 142 and can have tapered edges complementary to the tapered head 122. The key engagement operates when the ESP system (10) starts or shuts down as noted herein by the spring-loaded ratcheting of the keys 144 with the pockets 124 at a pre-defined torque. In practice, frictional surfaces can be provided on the adjacent the keys 144 and head 122 to provide at least some frictional clutch engagement.

An alternative form of flow valve 154 is also shown for the piston 130. Here, the flow valve 154 is a form of throttle valve. A biased valve body 155 of the throttle valve 154 can seat in the sleeve 131a and can restrict or throttle the flowback fluid passing from the housing bore 112 uphole of the piston 130 and through the flow openings or windows 134a in the sleeve 131a. When the pump (40) is operated and fluid pressure moves the piston 130 to a disengaged condition, the biased valve body 155 can unseat in the sleeve 131a and can allow lifted fluid to pass out the windows 134a to the housing bore 112.

FIG. 6 illustrates a cross-sectional view of a portion of yet another safety brake device 100 of the present disclosure using a clutch engagement between the piston 130 and the extension shaft 120. Operation of this device 100 can be similar to that discussed above so that the details are incorporated herein and are not repeated.

The piston 130 has a clutch 170 having an opening with a tapered surface 172. The shaft 120 includes a tapered head 122. Under pressure from pump (40) downhole of the device 100, the piston 130 separates from the shaft 120 and holds the surfaces of the clutch 170 and head 122 away from one another. However, the clutch engagement operates with fluid fallback acting on the piston 130 and uses friction and force between the engaged surfaces of the clutch 170 and head 122 to prevent rotation of the shaft 120. The clutch engagement can be configured for various pressure loads relative to the coefficient of friction between the mating surfaces.

FIGS. 2A, 5A, etc. illustrate a standard configuration for the disclosed safety brake device 100. As noted, the equalizing ports 115 are defined in the housing assembly 101a to communicate with the spring chamber 117 between the piston 130 and the housing 110. This allows for the pressure differential across the piston 130 to equalize as the wellbore fluid balances during shutdown of the pump (40). In other configurations, the safety brake device 100 of the present disclosure can have a drain configuration to prevent fallback fluid from flowing back through the pump (40). Details and benefits associated with using draining to prevent fallback fluid from flowing back through the pump (40) can be found in U.S. Pat. No. 7,900,707, which is incorporated herein by reference.

D. Drain Configuration

Figure 7:
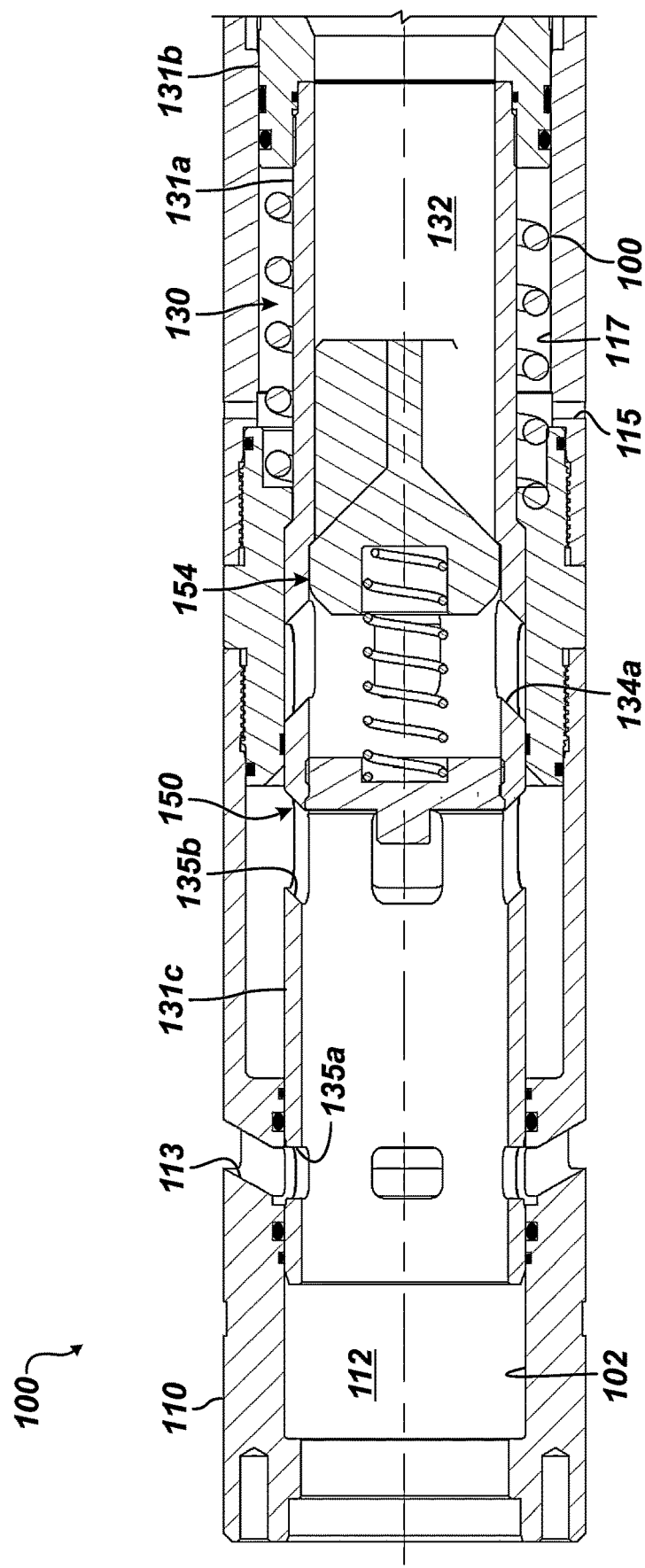
FIG. 7 illustrates a cross-sectional view of an alternative configuration for the disclosed safety brake device.

FIG. 7 illustrates a cross-sectional view of a drain configuration for the disclosed safety brake device 100. Only portion of the device 100 is shown in FIG. 7, as the other portions can be similar to the arrangements discussed previously in FIGS. 2A, 5A, etc. In this drain configuration, the housing assembly 101a includes bypass ports 113 that communicate with the internal bore 102 of the housing assembly 101a (i.e., with the bore 112 of the housing 110). The piston 130 includes drain windows 135a and bypass windows 135b in addition to the other features, such as the piston relief 150, piston windows 134a, flow valve 154, and the like. When the piston 130 is in the engaged position, the drain windows 135a can align with the housing bypass ports 113 so fluid in the column above the device 100 can be drained to the annulus outside the device 100. This diverts any fallback fluid and can further prevent shaft rotation. (As shown here, the sleeve 131a can seal inside the housing bore 112 to seal off the piston windows 134a when the piston 130 is in the engaged condition, but this may not be strictly necessary.)

When the piston 130 is in other positions during the disengaged condition, the sleeve 131a seals off the bypass ports 113 so fluid is not diverted out of the device 100. The bypass windows 135b allow fluid to communicate with the extended bore 132 through the piston windows 134a of the sleeve 131a extending beyond the piston relief 150. Additionally, the drain windows 135a can be misaligned with the housing bypass ports 113 so fluid in the column above the device 100 cannot pass to the annulus outside the device 100.

The previous arrangements of the disclosed safety brake device 100 as disclosed above use a piston 130 having features that include production flow windows 134a, a piston relief 150, and a flow valve 154. As noted, the flow valve 154 can be a ball check valve as shown in FIG. 2A or can be a throttle body valve as in FIG. 5A. Fluid pressure above the piston 130 acts against the piston end relief 150 and pushes the piston 130 against the bias of the spring 138 so that the flow through the flow windows 134a is restricted. The flow valve 154 within the piston relief 150 then ensures a controlled back flow to allow the well to equalize, while reducing the back-flow rate to ensure the fluid movement is not sufficient to drive the pump (40), thereby preventing dangerous voltage being generated by the PM motor (60).

E. Alternative Piston Relief

Figure 8A:
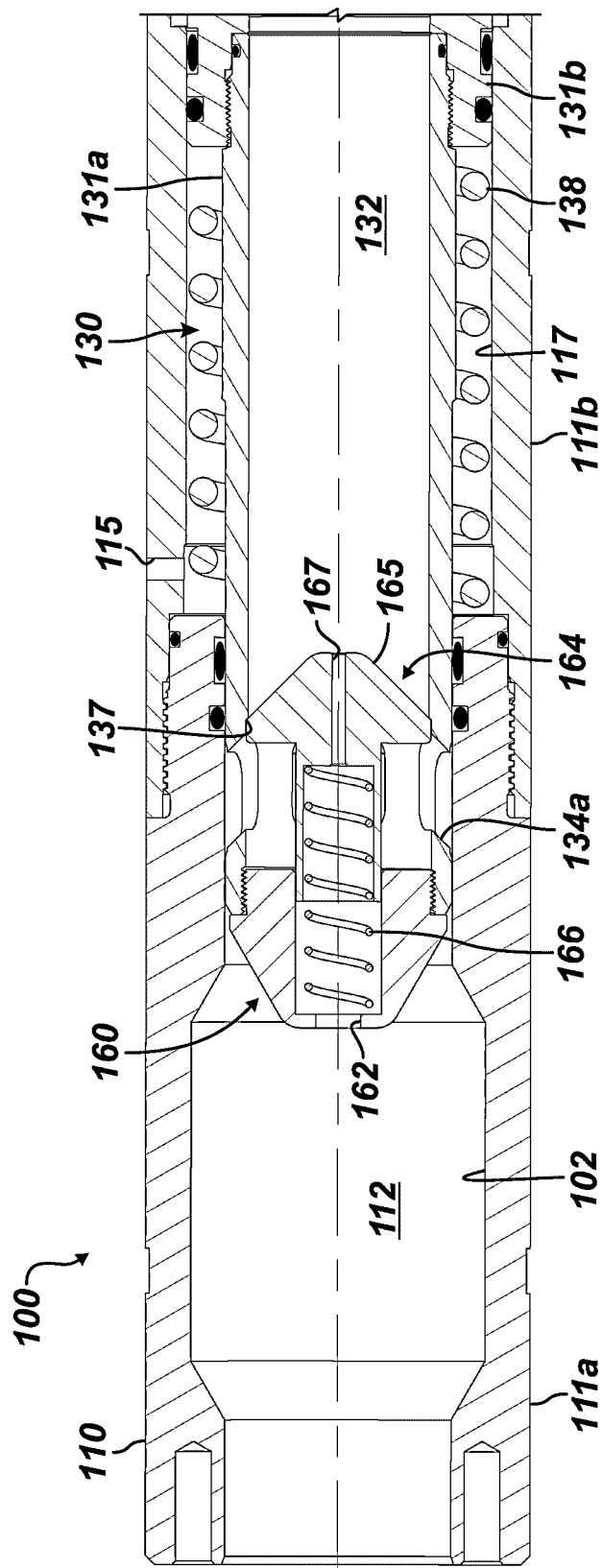

An alternative piston arrangement is disclosed in FIGS. 8A-8C, which show portions of a safety brake device 100. As before, the safety brake device 100 includes a housing 110—only two portions 111a-b of which are shown—and includes a piston 130 disposed in the housing bore 112. The piston 130 includes a sleeve 131a and a piston head 131b. Other features for the safety brake device 100 are similar to those disclosed above.

The piston 130 includes a piston relief 160 and a flow valve 164. The piston relief 160 is installed on the uphole end of the sleeve 131a. Here, the flow valve 164 is in the form of a throttle valve. In particular, a biased throttle body 165 of the throttle valve 164 is biased by a spring 166. The biased throttle body 165 can engage a seat 137 in the sleeve 131a as shown in FIG. 8A and can restrict or throttle the flowback fluid passing from the housing bore 112 uphole of the piston 130 and through the flow openings or windows 134a in the sleeve 131a.

When the pump (40) is operated, fluid pressure can move the piston 130 to a disengaged condition as shown in FIG. 8B. The biased throttle body 165 can unseat in the sleeve 131a as shown and can allow lifted fluid to pass out the windows 134a to the housing bore 112. At some point during operation when the piston 130 is in the disengaged condition, the biased valve body 165 can move toward the seat 137 in the sleeve 131a as shown in FIG. 8C.

The piston relief 160 includes a central passage or bleed port 162 for flow back. The biased throttle body 165 also includes a central passage or bleed port 167 for flow back. As discussed previously, the flow valve 164 permits pressure from uphole fluid to pass through the passages 162, 167 and into the piston's bore 132. For example, the flow valve 164 can typically open during flow-back of fluid when the piston 130 as shown in FIG. 8A is forced to its downhole position and flow through the piston's windows 134a is restricted. The flow valve 164 attached to the uphole end of the piston 130 can then choke the head of fluid above the safety brake device 100, thereby reducing the back flow when the ESP system (10) is shut down.

This flow valve 164 can keep the hydrostatic fluid pressure above the pump (i.e., above the piston 130) from replacing the pumped pressure, which could prevent the piston 130 from returning and engaging the clutch (e.g., 140). The piston 130 with this flow valve 164 can function as an Automatic Braking Servo (ABS) assembly. In particular, the hydrostatic pressure in the column above the ABS assembly of the piston 130 will act to bring further force onto the clutch (140) of the device 100. The clutch (140) will not operate properly if the piston 130 cannot return to its downward (engaged) condition as in FIG. 8A because the hydrostatic pressure falling back keeps the piston 130 in its upward position. With this flow valve 164, however, the entire pressure and weight of the fluid falling back rams the piston 130 downward and applies extra force onto the clutch (140) of the device 100. The slow bleed ports 162, 167 prevent the piston 130 from actually slamming as they acts as a dash pot. The fluid eventually equalizes through the bleed ports 162/167 so the operator will not have to pull a wet string should a workover be performed.

The features of the piston 130, the piston relief 160, and the flow valve 164 for the ABS assembly disclosed above can be used on any of the safety brake devices 100 disclosed herein. For example, FIGS. 9A-9B illustrate cross-sectional and end-sectional views of a safety brake device 100 having the alternative piston arrangement of FIGS. 8A-8C. Additionally, FIGS. 10A-10B illustrate cross-sectional and end-sectional views of another safety brake device 100 having the alternative piston arrangement of FIGS. 8A-8C. Similar reference numerals are used for similar components, and details are reincorporated herein. Finally, the features of the piston 130, the piston relief 160, and the flow valve 164 for the ABS assembly disclosed above can also be used in a drain configuration for the disclosed safety brake device 100, such as disclosed above in FIG. 7.

Previous arrangements of the safety brake device 100 disclosed herein use one clutch engagement between a piston and a shaft. Multiple clutch engagements can be configured in series to increase braking power. As an example, FIGS. 11A-11B illustrate cross-sectional views of another safety brake device 100 having a multiple clutch engagements. The safety brake device 100, which is similar to those discussed previously, includes a housing 110, an extension shaft 120, a piston 130, clutches 140a-b, and a piston relief 150. The clutches 140a-b include guide caps 141a-b and keys 144a-b. Each of the guide caps 141a-b holds the keys 144a-b and springs on the piston 130.

The distal end of the shaft 120 is directed toward the piston 130, which can move relative thereto. The piston head 131b defines clutch portions of surfaces 136a-b, and the shaft 120 has complementary surfaces 126a-b. As the piston 130 is moved in the housing 110 due to the pressure differential and other biasing on the piston 130, the clutch portions or surfaces 136a-b can be moved against the shaft's surfaces 126a-b. The frictional engagement can provide one method of preventing rotation of the shaft 120, and by extension, can prevent imparted rotation of the pump and motor shafts.

The shaft 120 also has pockets or slots 124a-b (i.e., pocket portions) defined in the sides of the shaft 120 into which the keys 144a-b (i.e., key sets) of the guide caps 141a-b can lock during ESP shutdown. Engagement between the key sets 144a-b with the pocket portions 124a-b provide another method of preventing shaft rotation. In particular, the key sets 144a-b are forced adjacent to the shaft 120 by springs so the key sets 144a-b engages the pocket portions 124a-b on the shaft 120. The key sets 144a-b and pocket portions 124a-b are designed so that they engage when fully aligned, thus preventing partial engagement during travel of the piston 130 and guide caps 141a-b relative to the head of the extension shaft 120.

As can be seen, one or more than one of these arrangements of the clutch 140a-b and key 144/pocket 124 engageable with the shaft 120 can be used on a safety brake device 100 of the present disclosure. Additionally, the alternative arrangements disclosed in FIGS. 5A-5B and 6 can be similarly configured to provide multiple clutch engagements between the piston 130 and shaft 120.

F. Serrated Keys and Nose

Figure 12B:
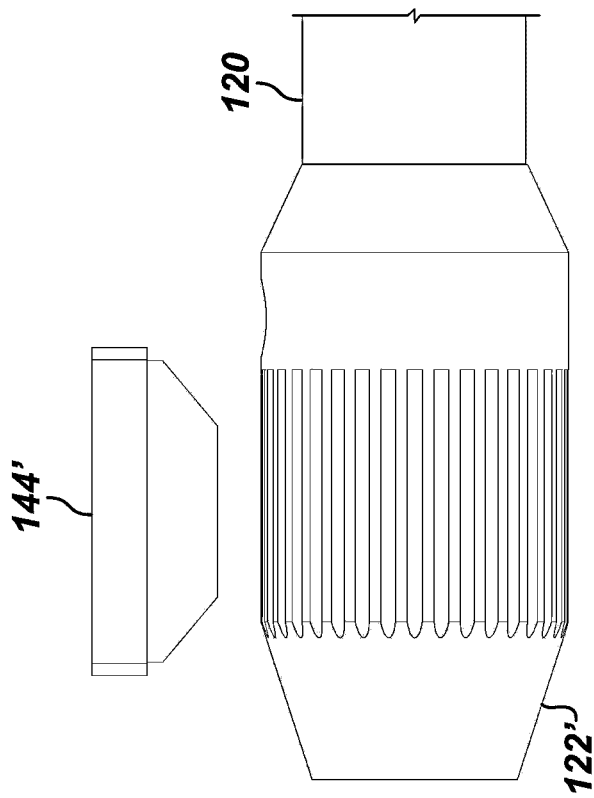
FIGS. 12A-12B illustrate perspective and side views of a serrated key and shaft head for a clutch arrangement of the present disclosure.
Figure 12A:
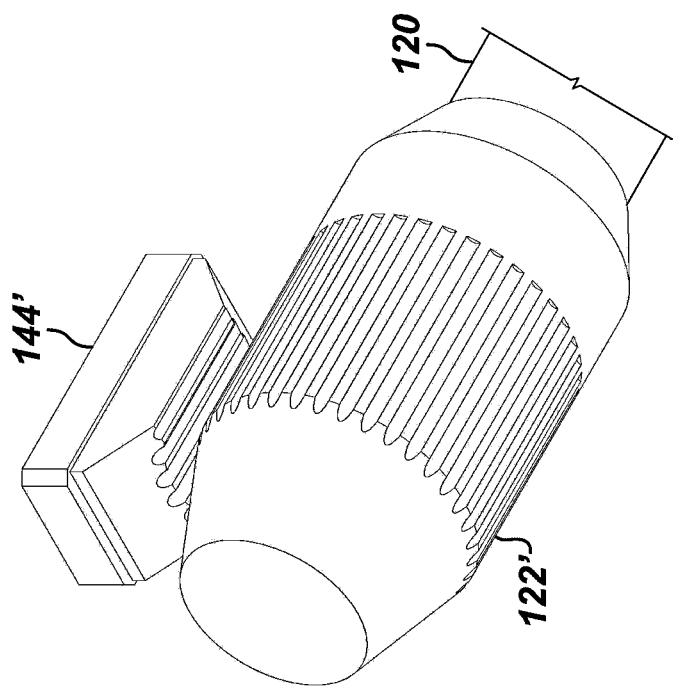

As an alternative to the sprung keys (144) and mating pockets (124) of a clutch (140) as in FIGS. 2A-2B, 3, 4B, 5A-5B, 9A-9B, 10A-10B, and 11A-11B, a serrated or splined surface of the shaft area and corresponding serrated, or ratcheted, or splined surface of the sprung key can be used. For example, FIGS. 12A-12B show examples of a serrated key 144' and a serrated head 122' for a shaft 120. The serrated interconnection allows the braking mechanism to have a smaller travel area of the keys 144' while maintaining or increasing the braking power. In the end, higher forces can be achieved to lock the parts together when the ESP system is inactive. Moreover, a strong load spring (e.g., disc springs) (not shown) can be used to bias the key 144', which can also reduce the travel required for the key 144'.

The tool has primary and secondary braking methods to ensure appropriate braking at different events during installation, retrieval, and normal operations.

G. Dual Braking Mechanisms

As disclosed herein, one braking mechanism for the disclosed safety brake devices (100) uses the sprung keys (144) that engage in mating pockets or slots (124) of a shaft (120). Depending on configuration of these features, the power needed to overcome the sprung keys (144) can be preconfigured for an implementation. This braking mechanism is designed to prevent rotation of the pump (40) and motor shaft (65) during installation and pulling activities when fluid is passing through the pump (40) as the pump (40) descends in the well or as the pump (40) rises out of the well.

An additional braking mechanism disclosed herein can increase the braking power to ensure that the total braking power is sufficient to prevent shaft rotation when the ESP system (10) is in the well and is shut down. When the ESP system (10) shuts down, the entire weight of the hydrostatic fluid in the tubing above the ESP system (10) descends by gravity and creates torque on the shaft (65) via the impellers of the pump (40). This hydrostatic power can be significant and can last for some time (perhaps half an hour) while the well equalizes. The additional braking mechanism is configured to have greater braking power than the torque generated by this hydraulic action on the impellers of the pump (40). By harnessing this hydrostatic power to increase the braking power of the additional braking mechanism, the safety brake devices (100) can use that power to prevent rotation regardless of what the fallback power may occur.

As described, the disclosed device 100 can include a first (primary or default) braking function and can include a second (secondary or augmented) braking function. The primary and secondary braking functions can ensure appropriate braking at different events during installation, retrieval, and normal operations.

For example, the primary braking function can be embodied by the sprung keys (144) that seat in mating pockets (124) described above. Depending on the implementation, the primary braking function can be configured so that a set output power of the pump's rotating shaft can overcome the sprung keys during normal operations. This primary braking function can be used for the default operation of the device 100 and can be primarily designed to prevent rotation of the pump and motor shaft during installation and pulling activities, when fluid is passing through the ESP system as it is descended in the well or as it is raised out of the well.

The secondary braking function brings into play additional power to increase the braking that can be achieved by the device 100 and to ensure that the braking power is sufficient to prevent shaft rotation when the ESP system is in the well and is shut down or fails (i.e., has a stoppage). When the ESP system shuts down, for example, the entire weight of the hydrostatic fluid in the tubing above the ESP system descends by gravity and creates a torque on the shaft via the impellers of the pump. As this hydrostatic power can be significant and can last for perhaps half an hour while the well equalizes, the secondary braking function must have greater braking power than that torque generated by this hydraulic action on the impellers. By harnessing this hydrostatic power to increase the braking power of the secondary braking function, the device 100 may ensure that, whatever the fallback power is, the secondary braking function will harness that power to prevent rotation.

Figure 13:
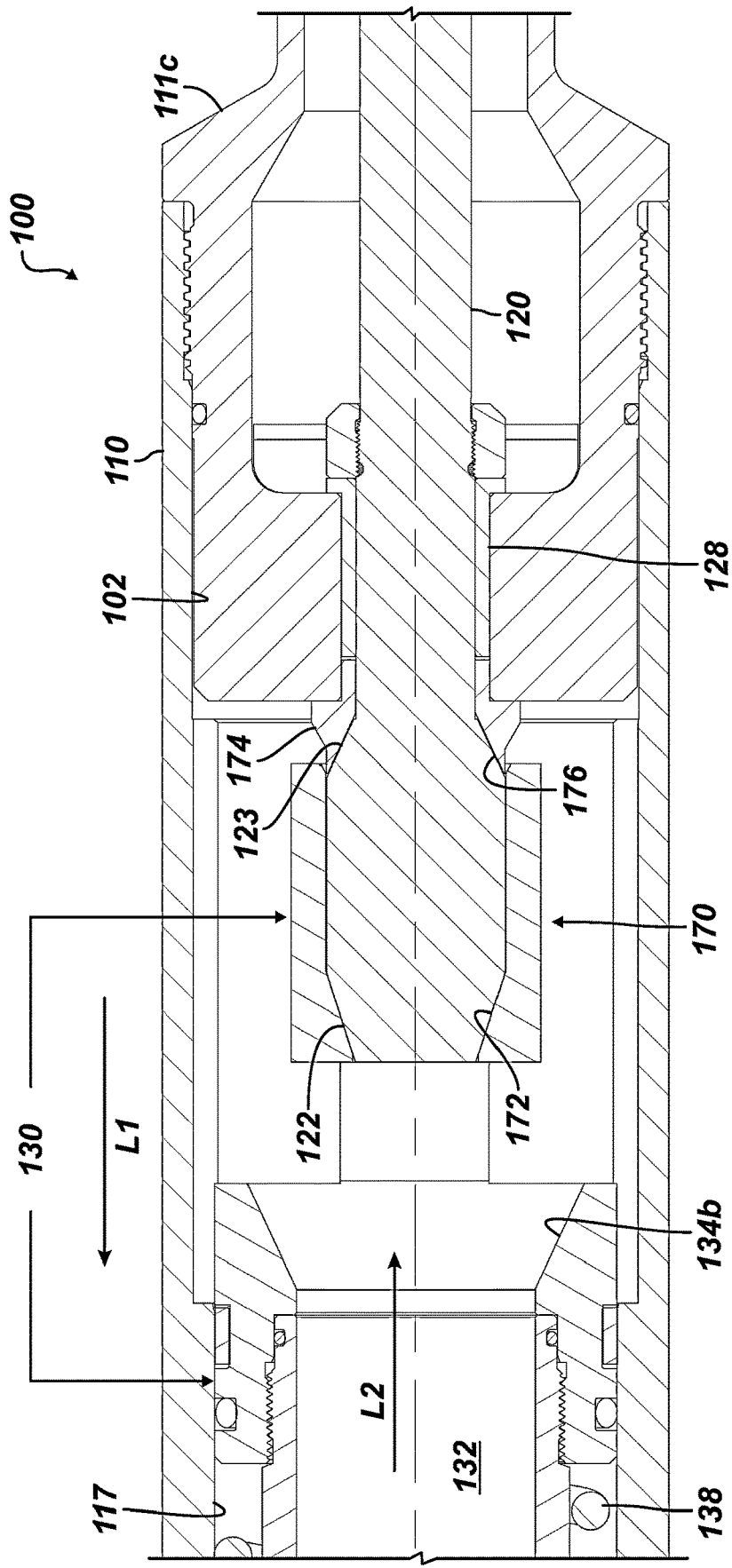
FIG. 13 illustrates a cross-sectional view of a portion of a safety brake device having a double clutch arrangement of the present disclosure.
Figure 14:
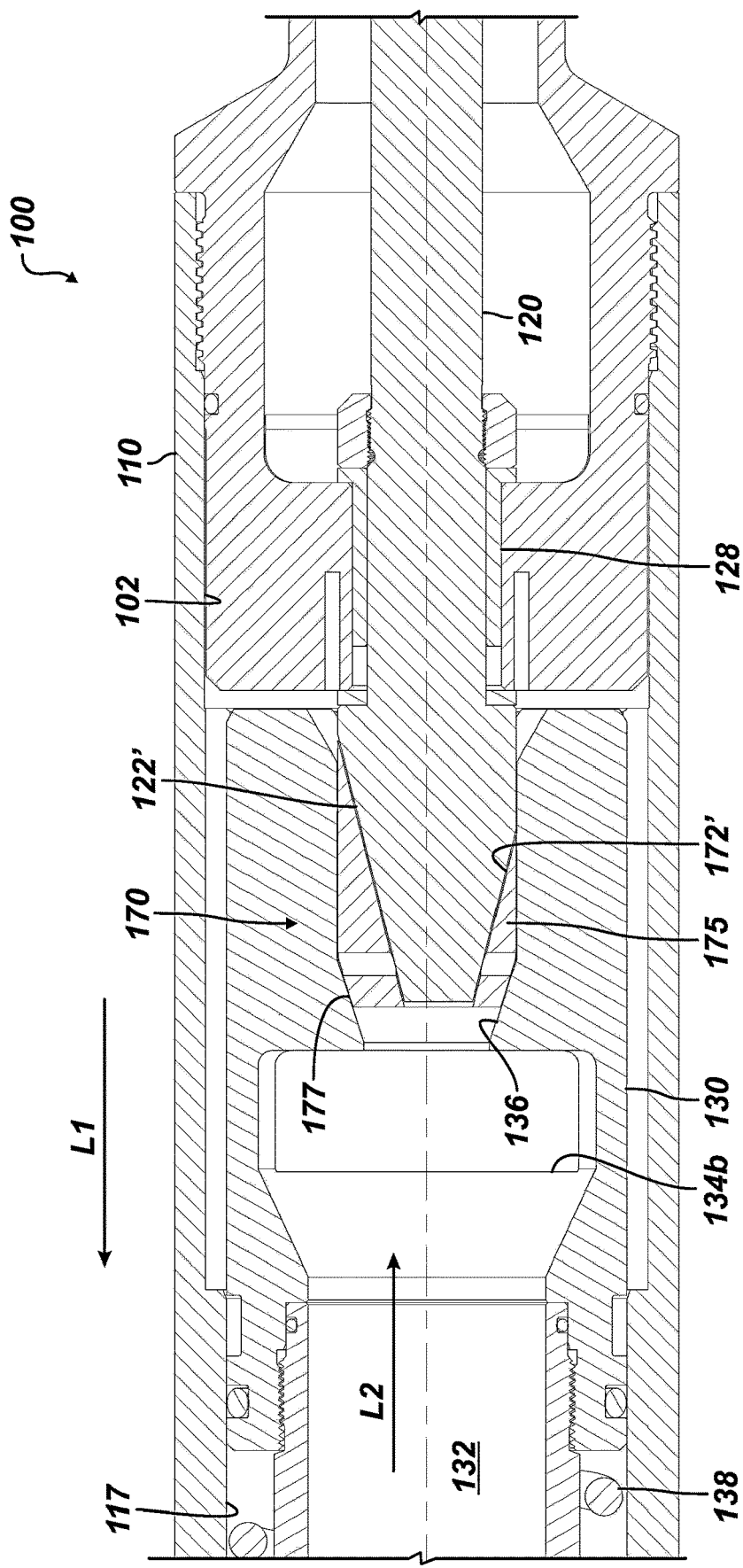
FIG. 14 illustrates a cross-sectional view of a portion of a safety brake device having an eccentric clutch arrangement of the present disclosure.

Any of the devices 100 disclosed herein can provide the primary braking function. FIGS. 13 and 14 discussed below provide a secondary braking function. As will be appreciated with the benefit of the present disclosure, any arrangements of the devices 100 disclosed herein may be configured to achieve both primary and secondary braking functions.

1. Dual-Facing Clutch

FIG. 13 shows a portion of a safety brake device 100 having an additional braking arrangement according to the present disclosure. The additional braking arrangement uses a dual-facing clutch 170 between the piston 130 and the extension shaft 120 to provide breaking forces on the shaft 120 when the pump (40) is installed and pulled as well as when the ESP system (10) shuts down. Operation of this device 100 can be similar to that discussed above so that the details are incorporated herein and are not repeated.

The piston 130 has the dual-facing clutch 170 having an opening with a tapered surface 172. The shaft 120 includes a tapered head 122. When fluid pressure from pump (40) downhole of the device 100 is pumped up through the safety brake device 100, the piston 130 separates in an axial direction L1 from the shaft 120 and holds the tapered surface 172 of the dual-facing clutch 170 away from the tapered head 122 of the shaft 120. However, as shown in FIG. 13, the piston 130 moves in an opposite axial direction L2 when the pump (40) is off. The engagement of the dual-facing clutch 170 operates with fluid fallback acting on the piston 130 and uses friction and forces between the tapered surface 172 of the clutch 170 engaged with the tapered head 122 to prevent rotation of the shaft 120. This engagement of the clutch 170 can be configured for various pressure loads relative to the coefficient of friction between the mating surfaces 122, 172.

Additional clutch engagement is provided by a seat 174 disposed on the housing 110 to engage a reverse clutch surface 123 on the shaft 120. The seat 174 can be disposed in the housing's passage for the shaft 120, where the bearing 128 is located. The shaft 120 passes through the seat 174, which includes an inclined surface 176 facing the reverse clutch surface 123 on the head 122. When fluid fallback acts on the piston 130, friction and forces between the engaged reverse clutch surface 123 of the shaft 120 and the inclined surface 176 of the seat 174 can further prevent rotation of the shaft 120.

The dual-facing clutch 170 provides increased surface area for the engagement between the piston 130 and the shaft 120 and between the shaft 120 and the housing 110 (seat 174 on the bottom subcomponent 111c). During operation of the ESP system (10), the piston 130 moves up and away in an axial direction L1 from the upper clutch surface 122 on the shaft 120. In turn, the clutch force is relieved on the reverse (lower) clutch surface 123 and seat surface 176. The seat 174 can have a minimum clearance with the shaft 120 because the rotating shaft 120 is biased upwards when pump (40) is operating so the shaft 120 would tend to unseat from the seat 174.

2. Eccentric Clutch

FIG. 14 shows a portion of a safety brake device 100 having another additional braking arrangement according to the present disclosure. This additional braking arrangement uses an eccentric clutch 170 between the piston 130 and the extension shaft 120 to provide breaking forces on the shaft 120 when the pump (40) is installed and pulled as well as when the ESP system (10) shuts down. Operation of this device 100 can be similar to that discussed above so that the details are incorporated herein and are not repeated.

The piston 130 has an opening having a tapered clutch surface 136, which is downhole-facing, conical, and concentric about the axis of the piston 130. The shaft 120 includes an eccentric tapered head 122', being uphole-facing, conical, and eccentric relative to the axis of the shaft 120. An insert 175, which is part of the piston 130, is disposed between the tapered clutch surface 136 and the eccentric tapered head 122'. Being part of the piston 130, the insert 175 can move with the axial movement of the piston 130 toward and away from the shaft 120 in the axial directions L1, L2. The insert 175 is configured to rotate on the piston 130. For example, a spring ring, bearing, pin, or other retainer (not shown) can be used to hold the insert 175 axially on the piston 130 while allowing the insert 175 to rotate.

The insert 175 includes a tapered clutch surface 177, which is conical, uphole-facing, and concentric. This tapered clutch surface 177 is configured to engage the piston's tapered clutch surface 136 in a concentric engagement. The passage in the insert 175 also includes an eccentric tapered surface 172', which is conical, downhole-facing, and eccentric. This eccentric tapered surface 172' is configured to engage the rod's eccentric tapered head 122' in an eccentric engagement.

Under pressure from pump (40) downhole of the device 100 lifting fluid through the safety brake device 100, the piston 130 separates in an axial direction L1 from the shaft 120 and holds the surfaces of the clutch 170 away from the eccentric tapered head 122'. However, as shown in FIG. 14, the piston 130 moves in an opposite axial direction L2 when the pump (40) is off and engages the clutch 170. (Because the shaft 120 may be shifted downward, a bushing 129 may be provided between the head 122' of the shaft 120 and the housing (e.g., bottom subcomponent 111c) if necessary.) The clutch engagement operates with fluid fallback acting on the piston 130 and uses friction and forces between the engaged surfaces of the clutch 170 and the head 122' to prevent rotation of the shaft 120. The clutch engagement can be configured for various pressure loads relative to the coefficient of friction between the mating surfaces.

Additional clutch engagement is provided by the eccentric tapered surfaces 122', 172'. When fluid fallback acts on the piston 130, for example, friction and forces between the engaged eccentric tapered surfaces 122', 172' can further prevent rotation of the shaft 120 because additional turning force would be required to displace the eccentric engagement. The insert 175 increases the turning force required for the engaged shaft 120 to rotate, which creates additional locking force. Additionally, the surface area of the clutch 170 is increased due to the larger eccentric contact area. During start up as the shaft 120 starts to turn, an increased initial force creates axial movement in the axial direction L1 that helps disengage the clutch 170.

Compared to this eccentric clutch 170, the dual-facing clutch 170 of FIG. 13 may provide greater braking force. Nevertheless, this eccentric clutch 170 in FIG. 14 has the potential to achieve both primary and secondary braking functions.

H. Automatic Braking Servo (ABS) Assembly

As disclosed herein, the braking by the safety brake device 100 can use the force of the spring (138) to provide braking. Moreover, the braking by the safety brake device 100 can use the hydraulic power from the fallback fluid to act on the brake to add power to meet the braking demands during any fallback situation. As noted previously, the safety brake device 100 can function as an Automatic Braking Servo (ABS) assembly whereby the safety brake device 100 uses the hydrostatic pressure in the column above the safety brake device 100 to increase braking power. To illustrate this, the graphs in FIGS. 15A-15C show the impact of hydrostatic power and torque on the breaking device 100.

Figure 15A:
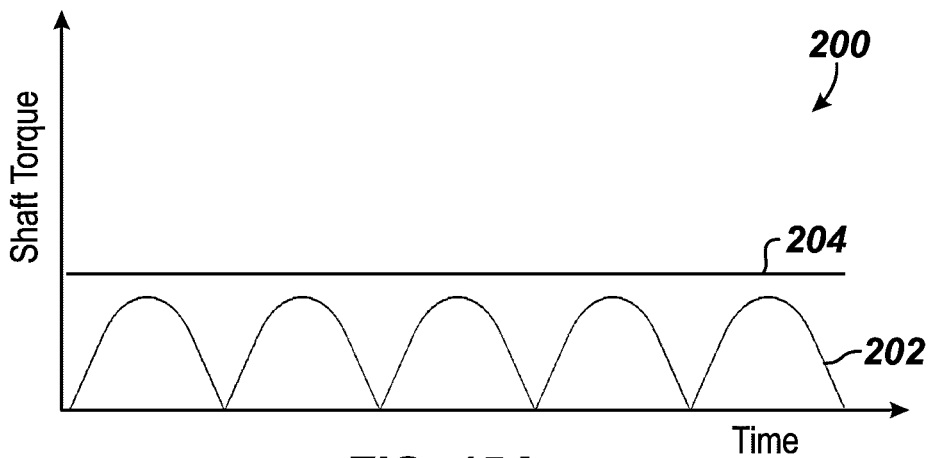
FIG. 15A illustrates a graph of torque generated by tripping an installation.

FIG. 15A illustrates a graph 200 of torque generated by tripping an installation having an ESP system (10) and the disclosed safety brake device (100). The torque 202 on the shaft (120) is graphed over time during the tripping operation. The shaft torque 202 is generated when the installation is run-in-hole (RIH) and pulled-out-of-hole (POOH). Because a rig at surface lowers/lifts the tubing (20; FIG. 1) and the pump (40) in the well (12) in stages while the cable (62) is secured/unsecured on the tubing (20) and while tubing joints are attached/detached to the tubing string, the torque 202 in that scenario will continuously increase and decrease to zero as can be seen on the graph 200. As shown, for example, fluid action on the impellers of the pump (40) stops each time a band is fitted/removed and joints made up/broken out on the installation. Therefore, the generated torque 202 cycles between peaks.

Based on the configuration of the disclosed safety brake device (100), the device's clutch arrangement (e.g., 140, 170, etc.) is set to provide a fixed primary braking power having a set toque level 204 that exceeds the torque 202 generated on the shaft (120) by tripping the installation. The tripping speed can be controlled to prevent peaks of the generated torque 202 from exceeding the set torque level 204 of the fixed primary braking power. For example, depending on the installation, the tripping speed may be set to less than 5 ft/sec.

Figure 15B:
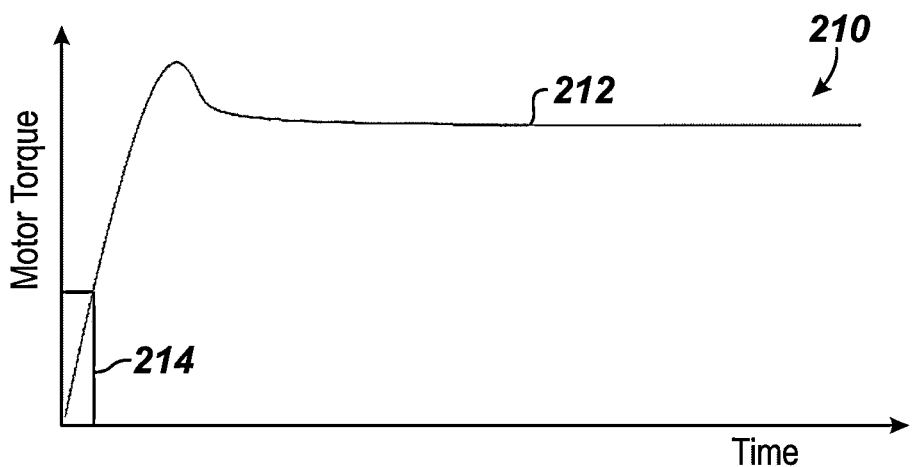
FIG. 15B illustrates a graph of motor torque over time during start up and running of the motor.
Figure 15C:
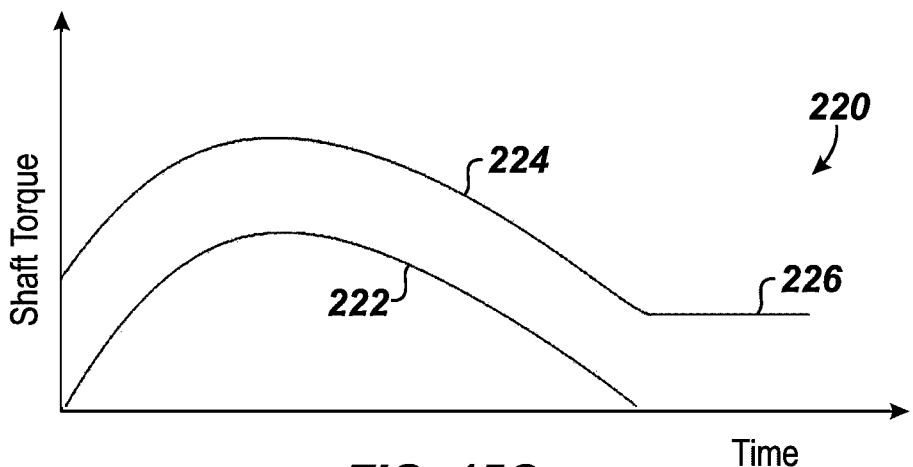
FIG. 15C illustrates a graph of torque generated on the shaft over time during fallback of fluid.

FIG. 15B illustrates a graph 210 of motor torque 212 over time during start up and running of the motor (60) of the ESP system (10). The set torque level 214 from the primary braking force is overcome early at time 216 in the start-up by the motor torque 212 as the pumped flow moves and disengages the primary braking provided by the clutch arrangement (e.g., 140, 170, etc.) of the disclosed safety brake device (100). From that point on, the disclosed safety brake device (100) is effectively invisible to the operation of the motor (60) and the pump (40).

FIG. 15C illustrates a graph 220 showing torque 222 generated on the shaft (120) over time during fallback of fluid. The fallback of fluid impacts the impellers of the pump (40), making the shaft (120) rotate and generate electric power in the motor (60) of the system (10). The torque 222 generated on the shaft (120) by the fallback fluid rises and falls over time during fallback of fluid. Initially, the servo-assisted braking power provides a torque level 224 that operates to prevent rotation of the shaft (120) until primary braking can re-engage at the set torque level 226. The disclosed safety brake device (100) utilizes the hydrostatic force of the falling back fluid to activate and servo-assist the secondary braking mechanism, such as disclosed in FIGS. 13-14. No matter how deep the ESP system (10) may be in the well, the disclosed safety brake device (100) can automatically meet the braking power required to prevent shaft rotation.

I. Well Kick Function

At times during operation of the ESP system (10) a fluid influx may occur in the well in what is commonly referred to as a well kick. FIGS. 16A-16B schematically illustrate operation of the disclosed safety brake device 100 during a well kick event. Normal operation of the safety brake device 100 is shown in FIG. 16A. The tubing pressure P1 is greater than the annulus pressure P2 as pressure from the pump (40) moves the piston 130 in the axial direction L1 and disengages both primary and secondary braking mechanisms.

A well kick event is shown in FIG. 16B. In this case, the annulus pressure P2 is greater than the tubing pressure P1. The well-kick fluid in the annulus enters the spring chamber 117 through the equalizing ports 115 and forces the piston 130 in the opposite axial direction L2. This action activates the servo braking force provided by the disclosed safety brake device 100 so reverse pressure in well kick event activates both the primary and secondary braking mechanisms of the device 100.

As is known, a well kick is when the well suddenly begins to flow. This may occur when personnel are working on site with the wellhead removed, and the well kick can drive fluid upwards and through the pump (40) (thus rotating the impeller) before the men at surface can realize the situation. This can be unsafe when the men are handling the electric cable.

As disclosed, the safety brake device 100 has a pressure-activated piston 130 that moves the entire braking arrangement (e.g., clutch, etc.) upward and out of the way during normal pumping operations, such as shown in FIG. 16A. Any fluid in the spring chamber 117 can pass to the annulus through the equalizing ports 115. Thus, when the pressure P1 in the safety brake device 100 (delivered by the pump) is greater than the annulus pressure P2, the piston 130 can be forced upward in the axial direction L1.

During a well kick event when the well is being worked over and there is no wellhead or packer in the hole, only a kill fluid is used in the well to prevent the well from flowing or kicking. For a well having an ESP system (10), fluid from the well from the well kick event can rapidly come to surface via the annulus and through the pump (40) into the tubing (20). This can occur even if the ESP system (10) is equipped with the safety brake device 100.

Because fluid and pressure take the path of least resistance, the fluid would come at greater pressure P2 via the annulus than the tubing (20). This is because the pump (40) and the tubing (20) act as a choke and is a much smaller flow area. This in turn means the annulus pressure P2 near the ESP system (10) and the safety brake device 100 is greater than the tubing pressure P1. Fluid pressure entering the spring chamber 117 through the equalizing ports 115 acts in the opposite direction on the piston 130, allowing the entering fluid to force the piston 130 down in the opposite axial direction L2 as shown in FIG. 16B. Accordingly, the braking power provided by the safety brake device 100 can be increased to prevent rotation of the shaft (120) even during a well kick event.

J. Hydraulic Lock Mechanism

Figure 17:
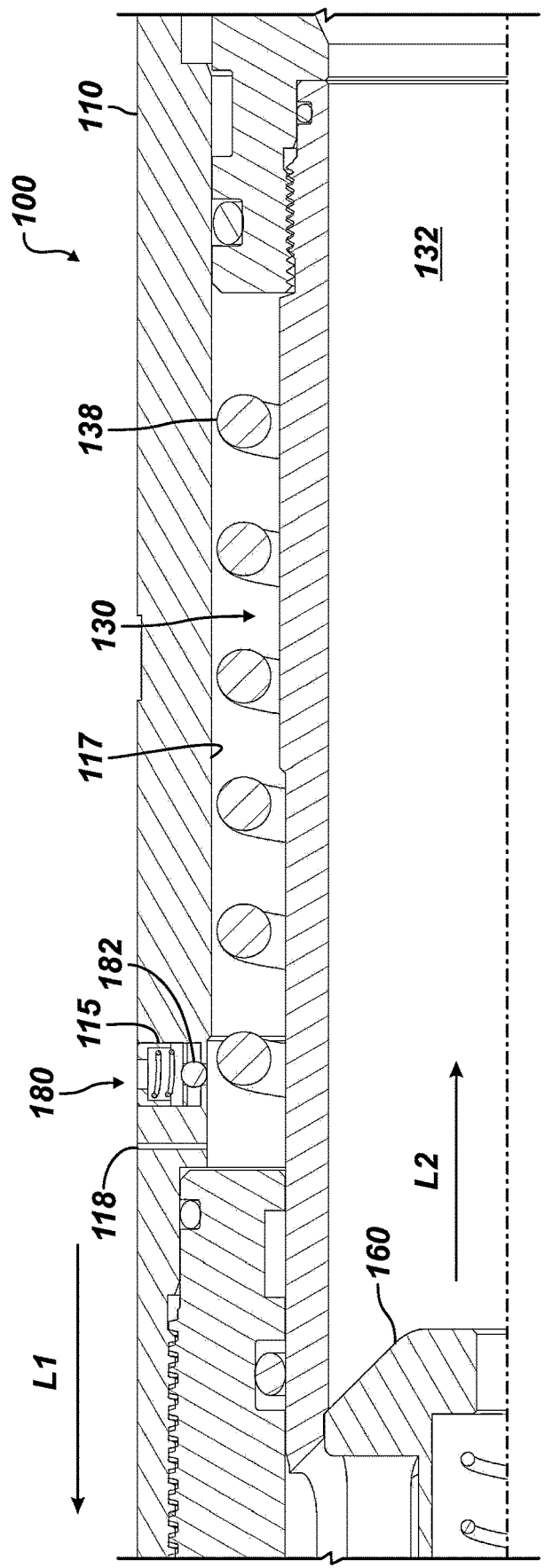
FIG. 17 illustrates a cross-sectional view of a portion of a safety brake device having a hydraulic lock arrangement of the present disclosure.

FIG. 17 illustrates a cross-sectional view of a portion of a safety brake device 100 having a hydraulic lock mechanism 180 of the present disclosure. Features of this safety brake device 100 can be similar to those disclosed herein. As shown, the housing 110 of the safety brake device 100 includes equalizing ports 115 that communicate the sealed spring chamber 117 between the sleeve 131*a* of the piston 130 and the housing 110 where the compression spring 138 is housed. The equalizing ports 115 allow the pressure differential across the piston 130 to equalize as the wellbore fluid balances during shutdown of the pump (40).

The hydraulic lock mechanism 180 includes a one-way check valve 182 disposed in the equalizing port 115. A smaller choke port or micro-hole 118 is provided for the sealed spring chamber 117. The one-way check valve 182 is biased to a closed condition, preventing fluid communication from the spring chamber 117 and out the equalizing port 115. When subject to hydraulic pressure in the chamber 117, the one-way check valve 182 can move to an opened condition, allowing fluid communication from the spring chamber 117 and out the equalizing port 115, such as when the piston 130 moves during operation.

During ESP operation, for example, the piston 130 moves in the axial direction L1 and compresses the return spring 138. The moving piston 130 forces fluid in the spring chamber 117 out through the one-way check valve 182. The piston 130 is intended to travel freely during ESP operation as the fluid in the chamber 117 can easily exit the check valve 182.

When the pump (40) stops during a stoppage of the ESP system (10), the piston 130 moves in the opposite axial direction L2. The movement of the piston 130 is slowed by the fluid trying to enter the spring chamber 117 from the wellbore annulus through the choke port 115. The return of the piston 130 is therefore controlled by the size of the choke port 118, creating a hydraulic lock. The choked flow reduces and dampens the piston's return, creating a soft lock as the clutch of the device 100 engages. This action can be useful in some implementations.

Figure 18A:
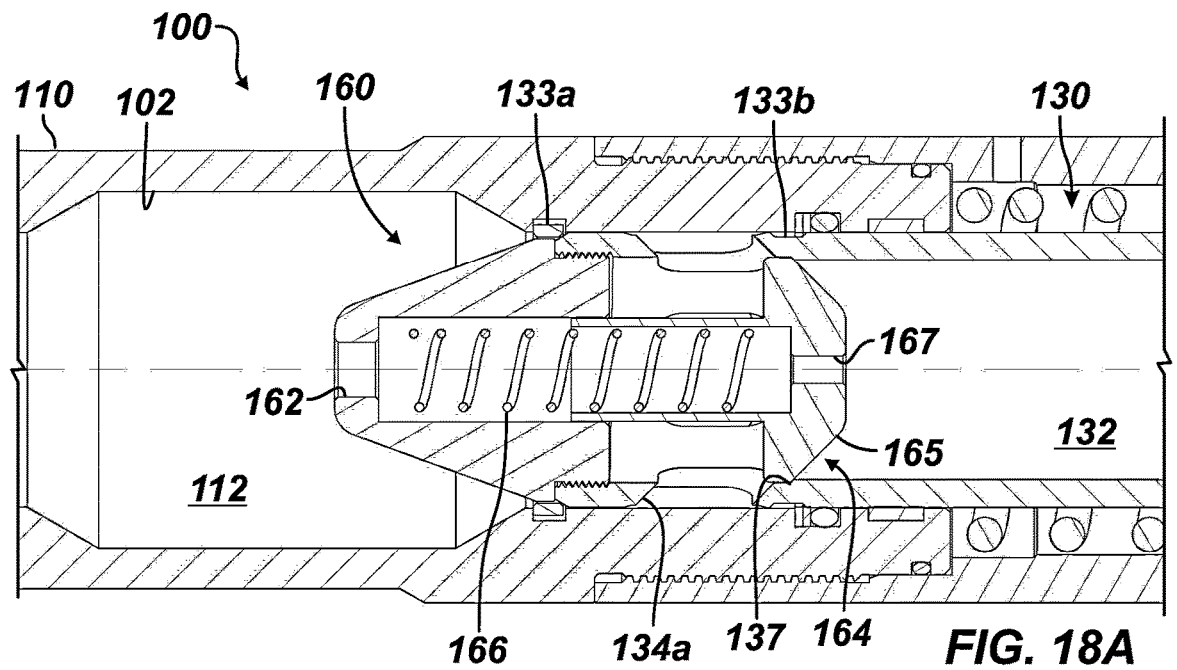
FIGS. 18A-18B illustrate cross-sectional views of a portion of a safety brake device having a temporary catch arrangement of the present disclosure.
Figure 18B:
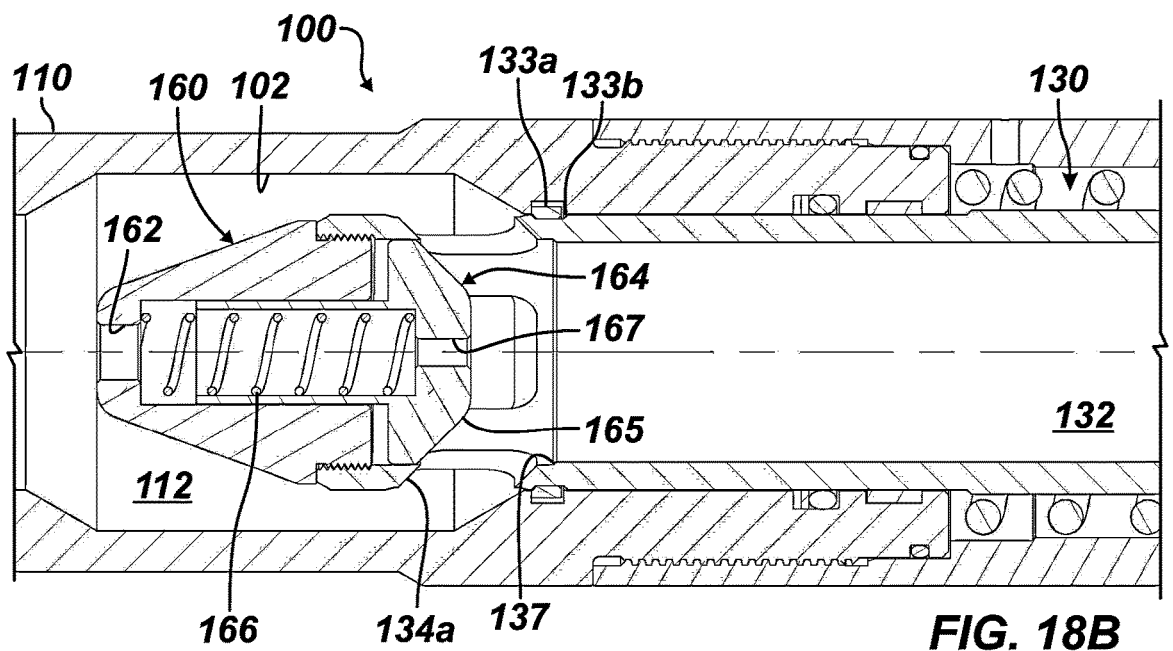

FIGS. 18A-18B illustrate cross-sectional views of a portion of a safety brake device 100 having a temporary catch arrangement of the present disclosure. Features of this safety brake device 100 can be similar to those disclosed herein.

As shown, the device 100 includes a catch arrangement (133*a*, 133*b*) to engage and hold the piston 130 at least temporarily in place during fluctuations in output pressure of the ESP system. The catch arrangement (133*a*, 133*b*) includes a catch 133*a* and a slot 133*b*. The catch 133*a* can include a snap ring or other biased retainer disposed inside the bore 112 of the housing 110. Meanwhile, the slot 133*b* is defined about the piston 130. With the piston 130 in a first position as in FIG. 18A when the ESP system is off/dormant, the slot 133*b* is moved away from the snap ring 133*a*. The snap ring 133*a* may engage against an edge of the piston 130, but the bias of the snap ring 133*a* can be overcome by upward movement of the piston 130 when the ESP system starts pumping.

During operations, the piston 130 moves upwards when the ESP system is operating and applies output pressure against the piston 130. The piston 130 moves to a second (stroked) position as in FIG. 18B, and the slot 133*b* is moved to an aligned position with the snap ring 133*a*. The snap ring 133*a* engages in the slot 133*b* and can at least temporarily hold the piston 130 in place.

As noted herein, upward movement of the piston 130 disengages the primary braking features (e.g., keys 144 and slotted head 124, mating cone surfaces 172/122, etc.) of the device 100 during normal pumping operations. In a gassy well, however, there may be fluctuations in the output pressure from the ESP system. In such a scenario, the piston 130 may be subject to shunting or bouncing in the device 100 as output pressure fluctuates up and down. The shunting or bouncing may move the piston 130 to such an extent that the primary braking features are engaged.

To avoid this, the snap ring 133*a* holds the piston 130 at least temporarily in place when the piston 130 is fully stroked. The engagement of the snap ring 133*a* with the slot 133*b* is configured to be strong enough to prevent unwanted bouncing should the pressure differential on the piston 130 fluctuate, but the engagement can be readily overcome by hydraulic downward force in the case of fluid fallback.

The foregoing description of preferred and other embodiments is not intended to limit or restrict the scope or applicability of the inventive concepts conceived of by the inventors. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A device used with an electric submersible pump (ESP) assembly disposed on tubing in a well, the ESP assembly having a pump and an electric motor, the device comprising:
a housing being configured to connect between the tubing and the pump, the housing having an internal bore configured communicate fluid therethrough;
a shaft disposed in the internal bore and being configured to rotate in response to rotation associated with the ESP assembly;
a piston disposed in the internal bore of the housing and being movable in a longitudinal movement relative to the shaft in response to a pressure differential across the piston; and
a clutch arranged between the piston and the shaft and being configured to engage and disengage between the piston and the shaft in response to the longitudinal movement of the piston, the clutch engaged with the shaft being configured to restrict the rotation of the shaft.

2. The device of claim 1, wherein the clutch is engaged in a first braking function between the piston and the shaft to prevent the rotation of the ESP assembly in response to fluid passing through the ESP assembly due to the ESP assembly being moved in the well.

3. The device of claim 2, wherein the clutch is further engaged in a second braking function between the piston and the shaft to prevent the rotation of the ESP assembly in response to a fallback of fluid in the tubing passing through the device to the ESP assembly due to a stoppage of the ESP assembly.

4. The device of claim 1, wherein the clutch comprises at least one surface and at least one key arranged between the piston and the shaft, the at least one key being configured to engage and disengage with the at least one surface in response to the longitudinal movement of the piston, the at least one key engaged with the at least one surface being configured to restrict the rotation of the shaft.

5. The device of claim 4, wherein the at least one surface is disposed on the shaft; and wherein the at least one key is disposed on the piston and is biased by a spring to extend inward from a retracted condition to an extended condition relative to shaft.

6. The device of claim 5, wherein the at least one surface comprises at least one pocket defined on the shaft, and wherein the at least one key disposed on the piston is configured to engage and disengage with the at least one pocket in response to the longitudinal movement of the piston, the at least one key engaged with the at least one pocket being configured to restrict the rotation of the shaft.

7. The device of claim 5, wherein the at least one surface on the shaft defines a first serrated surface, and the at least one key defines a second serrated surface being configured to engage the first serrated surface.

8. The device of claim 1, wherein the clutch comprises:
a first tapered surface disposed on the shaft; and
a second tapered surface disposed on the piston, the second tapered surface being configured to engage and disengage with respect to the first tapered surface of the shaft in response to the longitudinal movement of the piston respectively toward and away from the shaft, the second tapered surface engaged in friction engagement with the first tapered surface being configured to restrict the rotation of the shaft.

9. The device of claim 1, wherein the clutch comprises:
a first uphole-facing surface disposed on the shaft;
a first downhole-facing surface disposed on the shaft;
a second downhole-facing surface disposed on the piston and being configured to engage and disengage with respect to the first uphole-facing surface of the shaft in response to the longitudinal movement of the piston respectively toward and away from the shaft; and
a second uphole-facing surface disposed on the housing and being configured to engage and disengage with respect to the first downhole-facing surface of the shaft at least in response to the longitudinal movement of the piston toward the shaft.

10. The device of claim 9, wherein:
each of the first uphole-facing surface of the shaft and the second downhole-facing surface of the piston defines a tapered surface; and
the second downhole-facing surface of the piston engaged with the first uphole-facing surface of the shaft produces a first friction engagement configured to restrict the rotation of the shaft, and the first downhole-facing surface of the shaft engaged with the second uphole-facing surface of the housing produces a second friction engagement configured to restrict the rotation of the shaft.

11. The device of claim 9, wherein:
each of the first and second downhole-facing and uphole-facing surfaces defines a tapered surface; and
the second downhole-facing surface of the piston engaged with the first uphole-facing surface of the shaft produces a first friction engagement configured to restrict the rotation of the shaft, and the first downhole-facing surface of the shaft engaged with the second uphole-facing surface of the housing produces a second friction engagement configured to restrict the rotation of the shaft.

12. The device of claim 1, wherein the clutch comprises:
a first eccentric surface facing uphole on the shaft;
a first concentric surface facing downhole on the piston; and
an insert disposed on the piston and having a second concentric surface and a second eccentric surface, the second concentric surface facing uphole and being configured to engage and disengage with respect to the first concentric surface of the piston, the second eccentric surface facing downhole and being configured to engage and disengage with respect to the first eccentric surface of the shaft.

13. The device of claim 12, wherein at least one of:
each of the first and second eccentric and concentric surfaces defines a tapered surface; and
the first concentric surface of the piston engaged with the second concentric surface of the insert produces a concentric engagement configured to restrict the rotation of the shaft; and the first eccentric surface of the shaft engaged with the second eccentric surface of the insert produces an eccentric engagement configured to restrict the rotation of the shaft.

14. The device of claim 1, wherein the internal bore defines at least one longitudinal groove therein, and wherein the piston comprises at least one guide longitudinally movable in the at least one longitudinal groove and being configured to prevent rotation of the piston in the internal bore.

15. The device of claim 1, wherein the housing defines at least one equalizing port communicating with a sealed area between the piston and the internal bore of the housing, the at least one equalizing port equalizing the sealed area external to the housing.

16. The device of claim 1, wherein the housing defines at least one choke port and comprises at least one check valve communicating with a sealed area between the piston and the internal bore of the housing, the at least one check valve permitting fluid communication out of the sealed area external to the housing and preventing fluid communication external to the housing into the sealed area, the at least one choke port choking the fluid communication external to the housing into the sealed area.

17. The device of claim 1, wherein the piston comprises a biasing element engaged between the internal bore and the piston, the biasing element urging the piston toward the shaft.

18. The device of claim 1, wherein the piston comprises a flow valve disposed on an uphole end toward the tubing, the flow valve being configured to at least restrict fluid communication from an internal passage of the piston to the internal bore of the housing and being configured to permit flowback fluid passing from the internal bore uphole of the piston to the internal passage of the piston.

19. The device of claim 18, wherein the flow valve comprises a check valve having a ball biased by a spring relative to a seat in the piston; and wherein the piston defines one or more windows communicating the internal passage of the piston with the internal bore of the housing, the one or more windows throttling flow therethrough based on a longitudinal position of the piston in the internal bore of the housing.

20. The device of claim 18, wherein the piston defines one or more windows communicating the internal passage of the piston with the internal bore of the housing; and wherein the flow valve comprises a throttle body movably disposed in the internal passage of the piston relative to the one or more windows, the throttle body permitting fluid communication from the internal passage to the internal bore through the one or more windows and at least restricting the flowback fluid from the internal bore uphole of the piston passing through the one or more windows in the piston.

21. The device of claim 20, wherein at least one of:
the internal passage of the piston defines a seat therein, the throttle body being biased by a biasing element toward the seat; and
the throttle body defines a bleed port therethrough, the bleed port communicating the internal bore of the housing with the internal passage of the piston.

22. The device of claim 1, wherein the device comprises a catch arranged between the piston and the housing, the catch having an engaged condition and a disengaged condition, the catch in the engaged condition at least temporarily holding the piston in a stroked position in the internal bore.

23. The device of claim 22, wherein the catch comprises:
a snap ring disposed in the internal bore; and
a slot defined on the piston,
wherein the snap ring in the engaged condition engages in the slot aligned therewith.

24. The device of claim 22, wherein the catch is configured to remain in the engaged condition at least temporarily holding the piston in the stroked position in response to a range of fluctuation in the pressure differential.

25. The device of claim 1, wherein the piston defines one or more windows communicating an internal passage of the piston with the internal bore of the housing, the one or more windows throttling flow therethrough based on a longitudinal position of the piston in the internal bore of the housing.

26. The device of claim 1, wherein the housing defines at least one bypass port communicating the internal bore external to the housing; and wherein the piston defines at least one window communicating with an internal passage of the piston, the piston in a first longitudinal position in the internal bore having the at least one window aligned with the at least one bypass port, the piston in a second longitudinal position in the internal bore having the at least one window misaligned with the at least one bypass port.

27. The device of claim 1, wherein the housing comprises a flange being configured to connect to the ESP assembly; and wherein the shaft comprises a distal end being configured to connect to imparted rotation from the ESP assembly.

28. A system used with tubing in a well, the system comprising:
an electric submersible pump (ESP) assembly disposed on the tubing and having a pump and an electric motor; and
a safety brake device connected between the tubing and the pump, the safety brake device having an internal bore configured communicate fluid therethrough, the safety brake device comprising:
a shaft disposed in the internal bore and configured to rotate in response to rotation associated with the ESP assembly;
a piston disposed in the internal bore and being movable in a longitudinal movement relative to the shaft in response to a pressure differential across the piston; and
a clutch arranged between the piston and the shaft and being configured to engage and disengage between the piston and the shaft in response to the longitudinal movement of the piston, the clutch engaged with the shaft being configured to restrict the rotation of the shaft.

29. The system of claim 28, wherein the electric motor is a permanent magnet (PM) motor.

30. A method used with tubing in a well, the method comprising:
during a first operation involving an electric submersible pump (ESP) assembly pumping fluid from the well to the tubing, operating a brake device by:
moving a piston in the brake device away from a shaft in the brake device with a longitudinal movement in response to the fluid pumped by the ESP assembly through the brake device;
disengaging, in response to the longitudinal movement of the piston, a clutch arranged between the piston and the shaft; and
allowing the shaft to rotate in the brake device with rotation imparted by the ESP assembly; and
during a second operation involving the ESP assembly, operating the brake device by:
moving the piston in the brake device toward the shaft in the brake device with the longitudinal movement;
engaging, in response to the movement of the piston, the clutch arranged between the piston and the shaft; and
preventing rotation of the ESP assembly by restricting the rotation of the shaft in the brake device with the engagement of the clutch.

31. The method of claim 30, wherein moving the piston in the brake device toward the shaft in the brake device comprises one or more of: biasing the piston with a biasing element in the brake device, and hydraulically forcing the piston toward the shaft in response to fluid passing through the ESP assembly.

32. The method of claim 30, wherein operating the brake device during the second operation comprises operating the brake device with a first braking function to prevent the rotation of the ESP assembly as the ESP assembly is moved in the well.

33. The method of claim 30, wherein operating the brake device during the second operation comprises operating the brake device with a second braking function to prevent the rotation of the ESP assembly in response to a stoppage of the ESP assembly pumping the fluid.

34. The method of claim 33, wherein, in response to the stoppage of the ESP assembly, moving the piston in the brake device toward the shaft in the brake device comprises hydraulically forcing the piston toward the shaft in response to a fallback of fluid in the tubing passing through the brake device to the ESP assembly.

35. The method of claim 34, wherein hydraulically forcing the piston with the fallback of the fluid comprises throttling the fallback of the fluid through the piston.

36. The method of claim 30, wherein engaging, in response to the movement of the piston, the clutch arranged between the piston and the shaft comprises one or more of:
engaging one or more keys with one or more pockets in ratchet engagement between the piston and the shaft; and
engaging one or more first tapered surfaces of the piston in friction engagement with one or more second tapered surface of the shaft.

\* \* \* \* \*